US011824796B2

United States Patent
Hutchison et al.

(10) Patent No.: US 11,824,796 B2
(45) Date of Patent: *Nov. 21, 2023

(54) PROTOCOL INDEPENDENT PROGRAMMABLE SWITCH (PIPS) FOR SOFTWARE DEFINED DATA CENTER NETWORKS

(71) Applicant: Marvell Asia PTE, LTD, Singapore (SG)

(72) Inventors: Guy Townsend Hutchison, San Jose, CA (US); Sachin Ramesh Gandhi, San Jose, CA (US); Tsahi Daniel, Palo Alto, CA (US); Gerald Schmidt, San Jose, CA (US); Albert Fishman, Sunnyvale, CA (US); Martin Leslie White, Sunnyvale, CA (US); Zubin Shah, Santa Clara, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 556 days.

This patent is subject to a terminal disclaimer.

(21) Appl. No.: 16/992,978

(22) Filed: Aug. 13, 2020

(65) Prior Publication Data

US 2020/0374240 A1 Nov. 26, 2020

Related U.S. Application Data

(63) Continuation of application No. 15/786,900, filed on Oct. 18, 2017, now Pat. No. 10,785,169, which is a (Continued)

(51) Int. Cl.
*H04L 12/28* (2006.01)
*H04L 49/109* (2022.01)
(Continued)

(52) U.S. Cl.
CPC .......... *H04L 49/109* (2013.01); *G06F 3/0604* (2013.01); *G06F 3/064* (2013.01);
(Continued)

(58) Field of Classification Search
CPC ....... H04L 49/109; H04L 67/63; H04L 45/64; H04L 45/74; H04L 45/745;
(Continued)

(56) References Cited

U.S. PATENT DOCUMENTS 4,459,658 A 7/1984 Gabbe et al.
4,617,648 A 10/1986 Kuboki
(Continued)

FOREIGN PATENT DOCUMENTS

CN 1675635 A 9/2005
CN 1795437 A 6/2006
(Continued)

OTHER PUBLICATIONS

Notice of Allowance dated Jul. 24, 2020 for the Chinese Patent Application No. 201510229770.8.
(Continued)

*Primary Examiner* — Isaac M Woo

(57) ABSTRACT

A software-defined network (SDN) system, device and method comprise one or more input ports, a programmable parser, a plurality of programmable lookup and decision engines (LDEs), programmable lookup memories, programmable counters, a programmable rewrite block and one or more output ports. The programmability of the parser, LDEs, lookup memories, counters and rewrite block enable a user to customize each microchip within the system to particular packet environments, data analysis needs, packet processing functions, and other functions as desired. Further, the same microchip is able to be reprogrammed for other purposes and/or optimizations dynamically.

11 Claims, 12 Drawing Sheets

Related U.S. Application Data continuation of application No. 15/067,139, filed on Mar. 10, 2016, now Pat. No. 9,825,884, which is a continuation-in-part of application No. 14/144,270, filed on Dec. 30, 2013, now Pat. No. 9,379,963.

(60) Provisional application No. 62/133,166, filed on Mar. 13, 2015.

(51) Int. Cl.
| | |
|---|---|
| *G06F 3/06* | (2006.01) |
| *H04L 45/64* | (2022.01) |
| *H04L 45/745* | (2022.01) |
| *H04L 49/1546* | (2022.01) |
| *H04L 69/22* | (2022.01) |
| *H04L 49/00* | (2022.01) |
| *G06F 16/00* | (2019.01) |
| *H04L 45/74* | (2022.01) |
| *G06F 40/205* | (2020.01) |
| *H04L 67/63* | (2022.01) |

(52) U.S. Cl.
CPC .......... *G06F 3/0656* (2013.01); *G06F 3/0673* (2013.01); *G06F 16/00* (2019.01); *G06F 40/205* (2020.01); *H04L 45/64* (2013.01); *H04L 45/74* (2013.01); *H04L 45/745* (2013.01); *H04L 49/1546* (2013.01); *H04L 49/3018* (2013.01); *H04L 67/63* (2022.05); *H04L 69/22* (2013.01)

(58) Field of Classification Search
CPC . H04L 49/1546; H04L 49/3018; H04L 69/22; G06F 16/00; G06F 40/205; G06F 3/0604; G06F 3/064; G06F 3/0656; G06F 3/0673
USPC .................. 707/600–899; 370/392
See application file for complete search history.

(56) References Cited

U.S. PATENT DOCUMENTS

| | | | |
|---|---|---|---|
| 4,929,939 A | 5/1990 | Varma | |
| 5,319,347 A | 6/1994 | McClure | |
| 5,325,276 A | 6/1994 | Sullivam | |
| 5,613,071 A | 3/1997 | Rankin | |
| 5,625,276 A | 4/1997 | Scott | |
| 5,640,509 A | 6/1997 | Balmer | |
| 5,667,984 A | 9/1997 | Parekh et al. | |
| 5,721,858 A | 2/1998 | White et al. | |
| 5,729,712 A | 3/1998 | Whittaker | |
| 5,781,729 A | 7/1998 | Baker et al. | |
| 5,805,808 A | 9/1998 | Hasani et al. | |
| 5,959,914 A | 9/1999 | Gates | |
| 6,076,146 A | 6/2000 | Tran | |
| 6,088,356 A | 7/2000 | Hendel et al. | |
| 6,327,271 B1 | 12/2001 | Gotesman et al. | |
| 6,330,251 B1 | 12/2001 | O'Loughlin et al. | |
| 6,330,688 B1 | 12/2001 | Brown | |
| 6,341,129 B1 | 1/2002 | Schroeder et al. | |
| 6,356,951 B1 | 3/2002 | Gentry | |
| 6,606,301 B1 | 8/2003 | Muller et al. | |
| 6,636,879 B1 | 10/2003 | Doucette et al. | |
| 6,678,837 B1 | 1/2004 | Quach | |
| 6,782,462 B2 | 8/2004 | Marion et al. | |
| 6,789,116 B1 | 9/2004 | Sarkissian et al. | |
| 6,831,917 B1 | 12/2004 | Cheriton | |
| 6,952,425 B1 | 10/2005 | Nelson | |
| 7,017,162 B2 | 3/2006 | Smith | |
| 7,085,229 B1 | 8/2006 | Potter, Jr. | |
| 7,187,694 B1 | 3/2007 | Liao | |
| 7,263,099 B1 | 8/2007 | Woo et al. | |
| 7,277,957 B2 | 10/2007 | Rowley et al. | |
| 7,292,573 B2 | 11/2007 | La Vigne | |
| 7,293,113 B1 | 11/2007 | Krishna | |
| 7,359,403 B1 | 4/2008 | Rinne | |
| 7,367,052 B1 | 4/2008 | Desanti | |
| 7,391,735 B2 | 6/2008 | Johnson | |
| 7,440,573 B2 | 10/2008 | Lor et al. | |
| 7,461,167 B1 | 12/2008 | Park | |
| 7,502,374 B1 | 3/2009 | Parker et al. | |
| 7,568,047 B1 | 7/2009 | Aysan et al. | |
| 7,596,744 B1 | 9/2009 | Kow | |
| 7,606,263 B1 | 10/2009 | Parker | |
| 7,710,959 B2 | 5/2010 | Ramasamy et al. | |
| 7,715,611 B2 | 5/2010 | Eaton et al. | |
| 7,724,760 B2 | 5/2010 | Balkrishnan et al. | |
| 7,779,071 B2 | 8/2010 | Lor et al. | |
| 7,796,627 B2 | 9/2010 | Hurley et al. | |
| 7,797,489 B1 | 9/2010 | Jiang et al. | |
| 7,802,009 B2 | 9/2010 | Cui et al. | |
| 7,822,032 B1 | 10/2010 | Parker et al. | |
| 7,903,689 B2 | 3/2011 | Miinomi et al. | |
| 8,031,640 B2 | 10/2011 | Mitsumori | |
| 3,054,744 B1 | 11/2011 | Bishara et al. | |
| 8,054,744 B1 | 11/2011 | Bishara | |
| 8,112,800 B1 | 2/2012 | Yang et al. | |
| 8,144,706 B1 | 3/2012 | Daniel et al. | |
| 8,345,816 B1 | 1/2013 | Adiga et al. | |
| 8,432,908 B2 | 4/2013 | Li | |
| 8,437,200 B1 | 5/2013 | Tan | |
| 8,570,713 B2 | 10/2013 | Kumfer | |
| 8,576,173 B2 | 11/2013 | Verhaegh | |
| 8,599,850 B2 | 12/2013 | Jha | |
| 8,705,533 B1 | 4/2014 | Venkatraman | |
| 8,804,733 B1 | 8/2014 | Safrai | |
| 8,964,742 B1 | 2/2015 | Mizrahi et al. | |
| 9,064,058 B2 | 6/2015 | Daniel | |
| 9,159,420 B1 | 10/2015 | Wohlgemuth | |
| 9,226,308 B2 | 12/2015 | Ketchum et al. | |
| 9,241,304 B2 | 1/2016 | Dawson et al. | |
| 9,253,043 B2 | 2/2016 | Adolphson | |
| 9,258,277 B1* | 2/2016 | Zhuang | H04L 61/2539 |
| 9,313,115 B2 | 4/2016 | Kamerkar et al. | |
| 9,331,929 B1 | 5/2016 | Thomas et al. | |
| 9,379,963 B2 | 6/2016 | Tran | |
| 9,525,647 B2 | 12/2016 | Kopenen | |
| 9,582,440 B2 | 2/2017 | Gabbay et al. | |
| 9,590,820 B1 | 3/2017 | Shukla | |
| 9,590,914 B2 | 3/2017 | Alizadeh Attar et al. | |
| 9,620,213 B2 | 4/2017 | Tran et al. | |
| 9,654,409 B2 | 5/2017 | Yadav et al. | |
| 9,729,338 B2 | 8/2017 | Schmidt | |
| 9,742,694 B2 | 8/2017 | Anand | |
| 10,205,649 B2 | 2/2019 | Schmidt | |
| 11,526,290 B2 | 12/2022 | Koufaty | |
| 2001/0039550 A1 | 11/2001 | Putzolu | |
| 2001/0050914 A1 | 12/2001 | Akahane et al. | |
| 2002/0007277 A1 | 1/2002 | Besana et al. | |
| 2002/0009076 A1 | 1/2002 | Engbersen et al. | |
| 2002/0016852 A1 | 2/2002 | Nishihara | |
| 2002/0062394 A1 | 5/2002 | Bunn et al. | |
| 2002/0076142 A1 | 6/2002 | Song | |
| 2002/0083210 A1 | 6/2002 | Harrison et al. | |
| 2002/0099900 A1 | 7/2002 | Kawarai et al. | |
| 2002/0101867 A1 | 8/2002 | O'Callaghan et al. | |
| 2002/0163935 A1 | 11/2002 | Paatela et al. | |
| 2002/0191521 A1 | 12/2002 | Miniamino | |
| 2003/0037154 A1 | 2/2003 | Poggio et al. | |
| 2003/0093613 A1 | 5/2003 | Sherman | |
| 2003/0120806 A1 | 6/2003 | Clune et al. | |
| 2003/0144993 A1 | 7/2003 | Kishigami | |
| 2003/0152078 A1 | 8/2003 | Henderson et al. | |
| 2003/0190078 A1 | 10/2003 | Govindaswamy | |
| 2003/0193949 A1 | 10/2003 | Kojima et al. | |
| 2003/0198216 A1 | 10/2003 | Lewis | |
| 2003/0231634 A1 | 10/2003 | Savarda | |
| 2003/0210702 A1 | 11/2003 | Kendall | |
| 2003/0218978 A1 | 11/2003 | Brown | |
| 2003/0231625 A1 | 12/2003 | Calvignac et al. | |
| 2004/0019733 A1 | 1/2004 | Garinger | |
| 2004/0064589 A1 | 4/2004 | Boucher et al. | |
| 2004/0107295 A1 | 6/2004 | Herkersdorf | |

(56) References Cited

U.S. PATENT DOCUMENTS

| | | |
|---|---|---|
| 2004/0148425 A1 | 7/2004 | Haumont |
| 2004/0213370 A1 | 10/2004 | Smallwood et al. |
| 2004/0236897 A1 | 11/2004 | Cheng |
| 2005/0076228 A1 | 4/2005 | Davis |
| 2005/0138478 A1 | 6/2005 | Safford |
| 2005/0160151 A1 | 7/2005 | Rawson, III |
| 2005/0193240 A1 | 9/2005 | Ash |
| 2005/0213570 A1 | 9/2005 | Stacy et al. |
| 2005/0220107 A1 | 10/2005 | Del Regno |
| 2005/0232303 A1 | 10/2005 | Deforche et al. |
| 2005/0246716 A1 | 11/2005 | Smith |
| 2005/0256821 A1 | 11/2005 | Mishra |
| 2005/0276230 A1 | 12/2005 | Akahane et al. |
| 2005/0281281 A1 | 12/2005 | Nair et al. |
| 2006/0039372 A1 | 2/2006 | Sarkinen et al. |
| 2006/0045074 A1 | 3/2006 | Lee |
| 2006/0059269 A1 | 3/2006 | Chen et al. |
| 2006/0168309 A1 | 7/2006 | Sikdar et al. |
| 2006/0215653 A1 | 9/2006 | LaVigne |
| 2006/0215695 A1 | 9/2006 | Olderdissen |
| 2006/0259620 A1 | 11/2006 | Tamai |
| 2006/0280178 A1 | 12/2006 | Miller et al. |
| 2007/0011537 A1 | 1/2007 | Kiryu |
| 2007/0078997 A1 | 4/2007 | Stern |
| 2007/0101043 A1 | 5/2007 | Herman |
| 2007/0160052 A1 | 7/2007 | Okada |
| 2007/0168814 A1 | 7/2007 | Leininger |
| 2007/0180006 A1 | 8/2007 | Gyoten |
| 2007/0186085 A1 | 8/2007 | Yim |
| 2007/0195778 A1 | 8/2007 | Tatar |
| 2007/0263660 A1 | 11/2007 | Mitsumori |
| 2007/0268931 A1 | 11/2007 | Shaikli |
| 2008/0008159 A1 | 1/2008 | Bourlas et al. |
| 2008/0141023 A1 | 6/2008 | Qi |
| 2008/0222380 A1 | 9/2008 | Sze et al. |
| 2008/0279205 A1 | 11/2008 | Sgo |
| 2008/0304498 A1 | 12/2008 | Jorgensen |
| 2009/0028045 A1 | 1/2009 | Stellenberg et al. |
| 2009/0067325 A1 | 3/2009 | Baratakke et al. |
| 2009/0067446 A1 | 3/2009 | Lee |
| 2009/0234818 A1 | 9/2009 | Lobo et al. |
| 2009/0238190 A1 | 9/2009 | Cadigan, Jr. et al. |
| 2009/0307660 A1 | 12/2009 | Srinivasan |
| 2009/0328211 A1 | 12/2009 | Abraham |
| 2010/0107249 A1 | 4/2010 | Krig |
| 2010/0161787 A1 | 6/2010 | Jones |
| 2010/0259536 A1 | 10/2010 | Toksvig et al. |
| 2010/0272125 A1 | 10/2010 | Franke et al. |
| 2010/0318538 A1 | 12/2010 | Wyman |
| 2010/0329255 A1 | 12/2010 | Singhal |
| 2011/0022732 A1 | 1/2011 | Hutchison et al. |
| 2011/0026405 A1 | 2/2011 | Takagi et al. |
| 2011/0040923 A1 | 2/2011 | Ren |
| 2011/0058514 A1 | 3/2011 | Lee et al. |
| 2011/0103540 A1 | 5/2011 | Wassermann |
| 2011/0134920 A1 | 6/2011 | Dyke |
| 2011/0142070 A1 | 6/2011 | Lim et al. |
| 2011/0258040 A1 | 10/2011 | Gnanasambandam |
| 2011/0261698 A1 | 10/2011 | Kamerkar et al. |
| 2011/0261812 A1 | 10/2011 | Kini et al. |
| 2011/0268123 A1 | 11/2011 | Kopelman et al. |
| 2011/0295815 A1 | 12/2011 | Mandagere |
| 2011/0307656 A1 | 12/2011 | Hamdi et al. |
| 2011/0310892 A1 | 12/2011 | DiMambro |
| 2012/0016845 A1 | 1/2012 | Bates |
| 2012/0134356 A1 | 5/2012 | Groarke et al. |
| 2012/0159132 A1 | 6/2012 | Abel |
| 2012/0192035 A1 | 7/2012 | Nakanishi |
| 2012/0254579 A1 | 10/2012 | Schroeder et al. |
| 2012/0257627 A1 | 10/2012 | Nguymetal |
| 2012/0260038 A1 | 10/2012 | Imazaki |
| 2012/0281714 A1 | 11/2012 | Chang et al. |
| 2012/0311197 A1 | 12/2012 | Larson et al. |
| 2013/0034100 A1 | 2/2013 | Goyal et al. |
| 2013/0039278 A1 | 2/2013 | Bouazizi et al. |
| 2013/0054897 A1 | 2/2013 | Flemming et al. |
| 2013/0055033 A1 | 2/2013 | Frazier |
| 2013/0111308 A1 | 5/2013 | Sauber |
| 2013/0163427 A1 | 6/2013 | Beliveau et al. |
| 2013/0163475 A1 | 6/2013 | Beliveau |
| 2013/0191701 A1 | 7/2013 | Mueller |
| 2013/0195457 A1 | 8/2013 | Levy et al. |
| 2013/0215906 A1 | 8/2013 | Hidai |
| 2013/0238792 A1 | 9/2013 | Kind et al. |
| 2013/0290752 A1 | 10/2013 | Jones et al. |
| 2013/0294458 A1 | 11/2013 | Yamaguchi et al. |
| 2013/0326083 A1 | 12/2013 | Boucher et al. |
| 2014/0056141 A1 | 2/2014 | Breternitz, Jr. |
| 2014/0078902 A1 | 3/2014 | Edsall et al. |
| 2014/0086378 A1 | 3/2014 | Felten et al. |
| 2014/0108759 A1 | 4/2014 | Iwamitsu |
| 2014/0119231 A1 | 5/2014 | Chan et al. |
| 2014/0153443 A1 | 6/2014 | Carter |
| 2014/0181374 A1 | 6/2014 | Ellard |
| 2014/0181473 A1 | 6/2014 | Dice |
| 2014/0181827 A1 | 6/2014 | Dice |
| 2014/0241353 A1 | 8/2014 | Zhang |
| 2014/0269307 A1 | 9/2014 | Banerjee et al. |
| 2014/0307579 A1 | 10/2014 | Calo |
| 2014/0328354 A1 | 11/2014 | Michael |
| 2014/0369363 A1 | 12/2014 | Hutchison |
| 2014/0369365 A1 | 12/2014 | Denio et al. |
| 2015/0081726 A1 | 3/2015 | Izenberg |
| 2015/0124614 A1 | 5/2015 | Alizadeh Attar et al. |
| 2015/0156288 A1 | 6/2015 | Lu |
| 2015/0172189 A1 | 6/2015 | Pitchai |
| 2015/0187419 A1 | 7/2015 | Tran |
| 2015/0189047 A1 | 7/2015 | Naaman et al. |
| 2015/0222533 A1 | 8/2015 | Birrittella et al. |
| 2015/0277911 A1 | 10/2015 | Khartikov et al. |
| 2016/0028623 A1 | 1/2016 | Kamath |
| 2016/0077904 A1 | 3/2016 | Wendel |
| 2016/0117148 A1 | 4/2016 | Jeon et al. |
| 2016/0197852 A1 | 7/2016 | Hutchison et al. |
| 2016/0274994 A1 | 9/2016 | Winkel |
| 2016/0292079 A1 | 10/2016 | Musoll |
| 2017/0048144 A1 | 2/2017 | Liu |
| 2020/0204504 A1 | 6/2020 | Musoll |
| 2021/0395155 A1 | 12/2021 | Kramer |

FOREIGN PATENT DOCUMENTS

| | | |
|---|---|---|
| CN | 1798102 A | 7/2006 |
| CN | 101026586 A | 8/2007 |
| CN | 101095310 A | 12/2007 |
| CN | 101112056 A | 1/2008 |
| CN | 101237419 A | 8/2008 |
| CN | 101286215 A | 10/2008 |
| CN | 101517534 A | 8/2009 |
| CN | 101543018 A | 9/2009 |
| CN | 101563908 A | 10/2009 |
| CN | 101686102 A | 3/2010 |
| CN | 101694627 A | 4/2010 |
| CN | 101777791 A | 7/2010 |
| CN | 101854361 A | 10/2010 |
| CN | 101958902 A | 1/2011 |
| CN | 102104541 A | 6/2011 |
| CN | 102204180 A | 9/2011 |
| CN | 102273149 A | 12/2011 |
| CN | 102353894 A | 2/2012 |
| CN | 102377803 A | 3/2012 |
| CN | 102523285 A | 6/2012 |
| CN | 102656850 A | 9/2012 |
| CN | 10286961 A | 1/2013 |
| CN | 103444138 A | 2/2013 |
| CN | 103064796 A | 4/2013 |
| CN | 103177772 A | 6/2013 |
| CN | 103268267 A | 8/2013 |
| CN | 103347013 A | 10/2013 |
| CN | 103384224 A1 | 11/2013 |
| CN | 103460751 A | 12/2013 |
| CN | 103597794 A | 2/2014 |
| CN | 103856405 A | 6/2014 |
| CN | 103959302 A | 7/2014 |

(56) References Cited

FOREIGN PATENT DOCUMENTS

| | | | |
|---|---|---|---|
| CN | 104010049 A | 8/2014 | |
| CN | 104012063 A | 8/2014 | |
| EP | 1553738 A1 | 7/2005 | |
| EP | 1735957 A2 | 12/2006 | |
| EP | 2529528 A1 | 12/2012 | |
| JP | 2000196672 A | 7/2000 | |
| JP | 2000253061 A | 9/2000 | |
| JP | 2001024641 A | 1/2001 | |
| JP | 2002077269 A | 3/2002 | |
| JP | 2002198430 A | 7/2002 | |
| JP | 2002208938 A | 7/2002 | |
| JP | 2003308206 A | 10/2003 | |
| JP | 2005522948 A | 7/2005 | |
| JP | 2007503770 A | 2/2007 | |
| JP | 2007166514 | 6/2007 | |
| JP | 2007166514 A | 6/2007 | |
| JP | 2007208963 A | 8/2007 | |
| JP | 2009260880 A | 11/2009 | |
| JP | 2009272912 A | 11/2009 | |
| JP | 20100233018 A | 10/2010 | |
| JP | 2013055642 A | 3/2013 | |
| JP | 2014510504 A | 4/2014 | |
| KR | 100441317 | 6/2013 | |
| TW | 200832408 A | 8/2008 | |
| TW | 201134252 A | 10/2011 | |
| WO | 2005036834 A1 | 4/2005 | |
| WO | 2009133918 A | 11/2009 | |
| WO | 2009133918 A1 | 11/2009 | |
| WO | 20100144704 A1 | 12/2010 | |
| WO | 2011078108 A1 | 6/2011 | |
| WO | 2011093835 A1 | 8/2011 | |
| WO | 2012138370 A1 | 10/2012 | |
| WO | 2013093857 A1 | 6/2013 | |
| WO | 2013119241 A1 | 8/2013 | |

OTHER PUBLICATIONS

Korean Office Action dated May 27, 2021 for Korean Patent Application No. 10-2015-0086078.
Korean Office Action dated May 27, 2021 for Korean Patent Application No. 10-2015-0087785.
Korean Office Action dated May 27, 2021 for Korean Patent Application No. 10-2015-0087800.
Office Action dated Apr. 30, 2021 for Korean Application No. 10-2015-0084526.
Office Action dated Apr. 30, 2021 for Korean Application No. 10-2015-0086042.
Decision to Grant dated Jul. 14, 2021, for the Korean Patent Application No. 10-2014-0194209.
Official Action dated Nov. 18, 2021, from the Korean Patent Application: 10-2015-0086042.
Korean Office Action dated Oct. 16, 2020 for the Korean Patent Application No. 10-2014-0192064.
Korean Office Action dated Dec. 4, 2020 for the Korean Patent Application No. 10-2014-0194209.
Second Official Action dated Jan. 19, 2023 from the Indian Patent Application No. 841/DEL/2015.
Indian Office Action dated Sep. 24, 2020 for the Indian Patent Application No. 847/DEL/2015.
Indian Office Action dated Sep. 25, 2020 for the Indian Patent Application No. 836/DEL/2015.
Second Official Action dated Nov. 28, 2022, from the Indian Patent Application No. 836/DEL/2015.
Office Action dated Apr. 29, 2021 for Korean Application No. 10-2015-0083631.
Adamchik, Binary Trees, published Sep. 9, 2013 according to WayBack Machine, 8pages.
Parlante, Linked List Basics, http://cslibrary.standford.edu/103/LinkedListBasics.pdf, 26 pages, 2001.
Glen Gibb, "Reconfigurable Hardware for software-defined network", Nov. 2013, Standford University.
Notice of Allowance dated Aug. 27, 2020 for the Chinese Patent Application No. 201510229610.3.
Office Action dated Jun. 9, 2021 for Chinese Application No. 201610176470.2.
Indian Office Action for the Application No. 834/DEL/2015 dated Jul. 27, 2020.
Office Action dated Aug. 5, 2020 from Chinese Patent Application No. 201510253417.3.
Notice of Allowance dated Aug. 28, 2020 for the Chinese Patent Application No. 20168001150839.
Chinese Office Action dated Nov. 3, 2020 for the Chinese Patent Application No. 201510272436.0.
Chinese Office Action dated Nov. 3, 2020 for the Chinese Patent Application No. 201510272409.0.
Chinese Office Action dated Nov. 5, 2020 for the Chinese Patent Application No. 201510229779.9.
Office Action dated Aug. 19, 2021 for the Korean Patent Application No. 10-2014-0191978.
Office Action dated Jan. 4, 2022 for the Korean Patent Application No. 10-2021-0135712.
Office Action dated Jan. 27, 2022 for the Korean Patent Application No. 10-2021-0142837.
Kozanitis et al. Leaping Multiple Headers in a Single Bound: Wire-Speed Parsing Using the Kangaroo System.
Chinese Office Action dated Nov. 21, 2018 for the Chinese Application No. 2014108380634.
Chinese Office Action dated Jul. 17, 2019 for the Chinese Patent Application No. 201510276426.4.
Chinese Office Action dated Jul. 17, 2019 for the Chinese Patent Application No. 201510276588.8.
Chinese Office Action dated Jul. 29, 2019 for the Chinese Patent Application No. 2015102724093.
Chinese Office Action dated Aug. 22, 2019 for the Chinese Patent Application No. 2015102369392.
Chinese Office Action dated Aug. 5, 2019 for the Chinese Patent Application No. 201510272163X.
Chinese Office Action dated Aug. 5, 2019 for the Chinese Patent Application No. 201510229770.8.
Chinese Office Action dated May 6, 2020 for the Chinese Patent Application No. 201510272409.3.
Chinese Office Action dated May 8, 2020 for the Chinese Patent Application No. 201510229779.9.
Chinese Office Action dated May 18, 2020 for the Chinese Patent Application No. 201510229610.3.
Chinese Office Action dated May 18, 2020 for the Chinese Patent Application No. 201510272436.0.
Chinese Notice of Allowance dated Jun. 15, 2020 for the Chinese Patent Application No. 201510236939.2.
Chinese Office Action dated Mar. 18, 2020 for the Chinese Patent Application No. 201680015083.9.
Chinese Office Action dated Aug. 19, 2019 for the Chinese Patent Application No. 20150229799.
Japanese Office Action dated Aug. 26, 2019 for the Japanese Patent Application No. 2015122562.
Chinese Office Action dated Aug. 27, 2019 for the Chinese Patent Application No. 201502724360.
Chinese Office Action dated Aug. 27, 2019 for the Chinese Patent Application No. 20150229610.3.
Chinese Office Action dated Sep. 3, 2019 for the Chinese Patent Application No. 2015102726703.
Chinese Office Action dated Dec. 12, 2018 for the Chinese Patent Application No. 201410838433.4.
Altera, "White Paper", Jul. , pp. 1-9.
Bosshart, Pat, "Forwarding Metamophis: Fast Programmable Match-Action Processing in Hardware for SDN", Aug. 12, 2013, ACM, pp. 99-109.
Price, Charles, "MIPS IV Instruction Set", Sep. 1995, MIPS, pp. A-28-A-29 & A-105-A-106.
Japanese Office Action dated Mar. 18, 2019 for the Japanese Patent Application No. 2015122559.
Japanese Office Action dated Mar. 18, 2019 for the Japanese Patent Application No. 2015122561.

(56) References Cited

OTHER PUBLICATIONS

Japanese Office Action dated Mar. 18, 2019 for the Japanese Patent Application No. 2015-122562.
Taiwanese Office Action dated Sep. 17, 2018 for the Taiwanese Patent Application No. 103145450.
Japanese Office Action dated Mar. 25, 2019 for the Japanese Patent Application No. 2015122564.
Japanese Office Action dated Mar. 18, 2019 for the Japanese Patent Application No. 2015-122560.
Chinese Office Action dated Dec. 24, 2018 for the Chinese Patent Application No. 2014108439341.
Taiwanese Office Action dated Nov. 19, 2018 for the Taiwanese Patent Application No. 103145445.
Taiwanese Office Action dated Nov. 16, 2018 for the Taiwanese Patent Application No. 103145662.
Japanese Office Action dated Nov. 19, 2018 for the Japanese Patent Application No. 2014-267001.
Japanese Office Action dated Nov. 12, 2018 for the Japanese Patent Application No. 2014-267001.
Japanese Office Action dated Nov. 19, 2018 for the Japanese Patent Application No. 2014-267000.
Japanese Office Action dated Dec. 3, 2018 for the Japanese Patent Application No. 2014-263372.
Chinese Office Action dated Mar. 12, 2020 for the Chinese Patent Application No. 201510229770.8.
Chinese Office Action dated Mar. 2, 2020 for the Chinese Patent Application No. 201510272163.X.
Chinese Office Action dated Mar. 2, 2020 for the Chinese Patent Application No. 201510236939.2.
Chinese Notice of Allowance dated Sep. 30, 2019 for the Chinese Patent Application No. 201510320187.8.
Chinese Office Action dated May 21, 2019 for the Chinese Application No. 201410843934.1.
Taiwanese Office Action and Translation dated Sep. 11, 2018 for the Taiwanese Application No. 104112176.
Taiwanese Office Action and Translation dated Oct. 4, 2018 for the Taiwanese Application No. 104111755.
Taiwanese Office Action and Translation dated Sep. 20, 2018 for the Taiwanese Application No. 104110829.
Chinese Office Action and Search Report dated Aug. 20, 2018 for the Chinese Patent Application No. 201510320187.8.
Musin et al., Multiple Errors Detection Technique for RAM, IEE, Conference Paper, Pertinent pp. 1-4 (Year 2007).
Chinese Notice of Allowance dated Jul. 24, 2020 for the Chinese Patent Application No. 201510229770.8.
Notice of Allowance dated Jul. 24, 2020 for the Chinese Patent Application No. 201510272409.3.
Office Action dated Dec. 31, 2021 for Chinese Application No. 201610176470.2.
Office Action dated Jul. 31, 2020 from Chinese Patent Application No. 201610188963.8.
Korean Office Action dated May 1, 2023 for Korean Patent Application No. 10-2022-0137402.
Korean Office Action dated May 19, 2023 for Korean Patent Application No. 10-2022-0519367.

\* cited by examiner

| Layer0 | Layer1 | Layer2 | Layer4 | Layer5 | Layer6 | Layer7 |
|---|---|---|---|---|---|---|
| ETHERNET | IPV4 | ICMP | | | | |
| ETHERNET | IPV4 | IGMP | | | | |
| ETHERNET | IPV4 | TCP | | | | |
| ETHERNET | IPV4 | UDP | | | | |
| ETHERNET | IPV4 | UDP | VxLAN | ETHERNET | | |
| ETHERNET | IPV4 | UDP | VxLAN | ETHERNET | ARP | |
| ETHERNET | IPV4 | UDP | VxLAN | ETHERNET | IPv4 | |

Fig. 5

PROTOCOL INDEPENDENT PROGRAMMABLE SWITCH (PIPS) FOR SOFTWARE DEFINED DATA CENTER NETWORKS

RELATED APPLICATIONS

This application is a continuation of U.S. patent application Ser. No. 15/786,900, filed Oct. 18, 2017, and entitled "PROTOCOL INDEPENDENT PROGRAMMABLE SWITCH (PIPS) FOR SOFTWARE DEFINED DATA CENTER NETWORKS," which is a continuation of U.S. patent application Ser. No. 15/067,139, filed on Mar. 16, 2016, and entitled "PROTOCOL INDEPENDENT PROGRAMMABLE SWITCH (PIPS) FOR SOFTWARE DEFINED DATA CENTER NETWORKS," which claims priority under 35 U.S.C. § 119(e) of the U.S. provisional patent application No. 62/133,166, entitled "PIPS: PROTOCOL INDEPENDENT PROGRAMMABLE SWITCH (PIPS) FOR SOFTWARE DEFINED DATA CENTER NETWORKS," filed Mar. 13, 2015, and is a continuation-in-part of the co-pending U.S. patent application Ser. No. 14/144,270, entitled "APPARATUS AND METHOD OF GENERATING LOOKUPS AND MAKING DECISIONS FOR PACKET MODIFYING AND FORWARDING IN A SOFTWARE-DEFINED NETWORK ENGINE," and filed Dec. 30, 2013, all of which are hereby incorporated by reference.

FIELD OF THE INVENTION

The invention relates to the field of network devices. In particular, the invention relates to software defined data center devices, systems and methods.

BACKGROUND OF THE INVENTION

Software-Defined Networks (SDN) paradigm promises to address modern Data Center needs with a fine-grained control over the network. However, fixed pipeline switches are not providing the level of flexibility and programmability required by Software Defined Data Centers (SDDC) architectures to optimize the underlying networks. Specifically, although SDDC architectures put applications at the center of innovation, the full capability of theses applications is thwarted by rigid pipelines that are dictated by networking gears. For example, the applications are forced to be designed to use existing protocols, which slows down innovation.

SUMMARY OF THE INVENTION

Embodiments of the invention are directed to a software-defined network (SDN) system, device and method that comprises of one or more input ports, a programmable parser, a plurality of programmable lookup and decision engines (LDEs), programmable lookup memories, programmable counters, a programmable rewrite block and one or more output ports. The programmability of the parser, LDEs, lookup memories, counters and rewrite block enable a user to customize each microchip within the system to particular packet environments, data analysis needs, packet processing functions, and other functions as desired. Further, the same microchip is able to be reprogrammed for other purposes and/or optimizations dynamically. Moreover, by providing a programmable pipeline with flexible table management, the PIPS enables a software defined method to address many packet processing needs.

A first aspect is directed to a switch microchip for a software-defined network. The microchip comprises a programmable parser that parses desired packet context data from headers of a plurality of incoming packets, wherein the headers that are recognized by the parser based on a software-defined parse graph of the parser, one or more lookup memories having a plurality of tables, wherein the lookup memories are configured as a logical overlay such that the scaling and width of the lookup memories are software-defined by a user, a pipeline of a plurality of programmable lookup and decision engines that receive and modify the packet context data based on data stored in the lookup memories and software-defined logic programmed into the engines by the user, a programmable rewrite block that based on the packet context data received from one of the engines rebuilds and prepares the packet headers as processed within the switch for output and a programmable counter block used for counting operations of the lookup and decision engines, wherein the operation that are counted by the counter block is software-defined by the user. In some embodiments, starting from the same initial node of the parse graph, each path through the parse graph represents a combination of layer types of one of the headers that is able to be recognized by the parser. In some embodiments, portions of the paths are able to overlap. In some embodiments, the rewrite block expands each layer of each of the headers parsed by the parser to form a expanded layer type of a generic size based on a protocol associated with the layer. In some embodiments, the rewrite block generates a bit vector that indicates which portions of the expanded layer type contain valid data and which portions of the expanded layer type contain data added during the expanding by the rewrite block. In some embodiments, the tables of the lookup memories are each able to be independently set in hash, direct access or longest prefix match operational modes. In some embodiments, the tables of the lookup memories are able to be dynamically reformatted and reconfigured by the user such that a number of tiles of the lookup memories partitioned and allocated for lookup paths coupled to the lookup memories is based on memory capacity needed by each of the lookup paths. In some embodiments, each of the lookup and decision engines comprise a Key Generator configured to generate a set of lookup keys for each input token and an Output Generator configured to generate an output token by modifying the input token based on content of lookup results associated with the set of lookup keys. In some embodiments, each of the lookup and decision engines comprise an Input Buffer for temporarily storing input tokens before input tokens are processed by the lookup and decision engine, a Profile Table for identifying positions of fields in each of the input tokens, a Lookup Result Merger for joining the input token with the lookup result and for sending the joined input token with the lookup result to the Output Generator, a Loopback Checker for determining whether the output token should be sent back to the current lookup and decision engine or to another lookup and decision engine and a Loopback Buffer for storing loopback tokens. In some embodiments, Control Paths of both the Key Generator and the Output Generator are programmable such that users are able to configure the lookup and decision engine to support different network features and protocols. In some embodiments, the counter block comprises N wrap-around counters, wherein each of the N wrap-around counters is associated with a counter identification and an overflow FIFO used and shared by the N wrap-around counters, wherein the overflow FIFO stores the associated counter identifications of all counters that are overflowing.

A second aspect is directed to a method of operating a switch microchip for a software-defined network. The method comprises parsing desired packet context data from headers of a plurality of incoming packets with a programmable parser, wherein the headers that are recognized by the parser based on a software-defined parse graph of the parser, receiving and modifying the packet context data with a pipeline of a plurality of programmable lookup and decision engines based on data stored in lookup memories having a plurality of tables and software-defined logic programmed into the engines by a user, transmitting one or more data lookup requests to and receiving processing data based on the requests from the lookup memories with the lookup and decision engines, wherein the lookup memories are configured as a logical overlay such that the scaling and width of the lookup memories are software-defined by the user, performing counting operations based on actions of the lookup and decision engines with a programmable counter block, wherein the counter operations that are counted by the counter block is software-defined by the user and rebuilding the packet headers as processed within the switch with a programmable rewrite block for output, wherein the rebuilding is based the packet context data received from one of the lookup and decision engines. In some embodiments, starting from the same initial node of the parse graph, each path through the parse graph represents a combination of layer types of one of the headers that is able to be recognized by the parser. In some embodiments, portions of the paths are able to overlap. In some embodiments, the rewrite block expands each layer of each of the headers parsed by the parser to form a expanded layer type of a generic size based on a protocol associated with the layer. In some embodiments, the rewrite block generates a bit vector that indicates which portions of the expanded layer type contain valid data and which portions of the expanded layer type contain data added during the expanding by the rewrite block. In some embodiments, the tables of the lookup memories are each able to be independently set in hash, direct access or longest prefix match operational modes. In some embodiments, the tables of the lookup memories are able to be dynamically reformatted and reconfigured by the user such that a number of tiles of the lookup memories partitioned and allocated for lookup paths coupled to the lookup memories is based on memory capacity needed by each of the lookup paths. In some embodiments, each of the lookup and decision engines comprise a Key Generator configured to generate a set of lookup keys for each input token and an Output Generator configured to generate an output token by modifying the input token based on content of lookup results associated with the set of lookup keys. In some embodiments, each of the lookup and decision engines comprise an Input Buffer for temporarily storing input tokens before input tokens are processed by the lookup and decision engine, a Profile Table for identifying positions of fields in each of the input tokens, a Lookup Result Merger for joining the input token with the lookup result and for sending the joined input token with the lookup result to the Output Generator, a Loopback Checker for determining whether the output token should be sent back to the current lookup and decision engine or to another lookup and decision engine and a Loopback Buffer for storing loopback tokens. In some embodiments, Control Paths of both the Key Generator and the Output Generator are programmable such that users are able to configure the lookup and decision engine to support different network features and protocols. In some embodiments, the counter block comprises N wrap-around counters, wherein each of the N wrap-around counters is associated with a counter identification and an overflow FIFO used and shared by the N wrap-around counters, wherein the overflow FIFO stores the associated counter identifications of all counters that are overflowing.

A third aspect is directed to a top of rack switch microchip. The microchip comprises a programmable parser that parses desired packet context data from headers of a plurality of incoming packets, wherein the headers that are recognized by the parser based on a software-defined parse graph of the parser and wherein, starting from the same initial node of the parse graph, each path through the parse graph represents a combination of layer types of one of the headers that is able to be recognized by the parser, one or more lookup memories having a plurality of tables, a Key Generator configured to generate a set of lookup keys for each input token and an Output Generator configured to generate an output token by modifying the input token based on content of lookup results associated with the set of lookup keys, wherein the lookup memories are configured as a logical overlay such that the scaling and width of the lookup memories are software-defined by a user, and further wherein each of the lookup memories are configured to selectively operate in hash, direct access or longest prefix match operational modes, a pipeline of a plurality of programmable lookup and decision engines that receive and modify the packet context data based on data stored in the lookup memories and software-defined logic programmed into the engines by the user, a programmable rewrite block that based on the packet context data received from one of the engines rebuilds and prepares the packet headers as processed within the switch for output, wherein the rewrite block expands each layer of each of the headers parsed by the parser to form a expanded layer type of a generic size based on a protocol associated with the layer and a programmable counter block used for counting operations of the lookup and decision engines, wherein the counter block comprises N wrap-around counters, wherein each of the N wrap-around counters is associated with a counter identification and an overflow FIFO used and shared by the N wrap-around counters, wherein the overflow FIFO stores the associated counter identifications of all counters that are overflowing, and further wherein the operations that are performed by the counter block are software-defined by the user.

BRIEF DESCRIPTION OF THE DRAWINGS

FIG. 5 illustrates an exemplary structure of a local parse map or table in accordance with some embodiments.

DETAILED DESCRIPTION OF THE PRESENT INVENTION

Embodiments of the a software-defined network (SDN) system, device and method comprise one or more input ports, a programmable parser, a plurality of programmable lookup and decision engines (LDEs), programmable lookup memories, programmable counters, a programmable rewrite block and one or more output ports. The programmability of the parser, LDEs, lookup memories, counters and rewrite block enable a user to customize each microchip within the system to particular packet environments, data analysis needs, packet processing functions, and other functions as desired. Further, the same microchip is able to be reprogrammed for other purposes and/or optimizations dynamically. As a result, the system provides the ability to programmatically customize the performance of the system creating unified hardware and software that can be used in various deployments. Further, it allows optimization tailed deployment to application specific needs. In other words, the system software-defined flexibility provides the ability to customize the same switch microchip such that it provides the same high bandwidth and high port density despite being positioned in multiple different places within a network.

Figure 1:
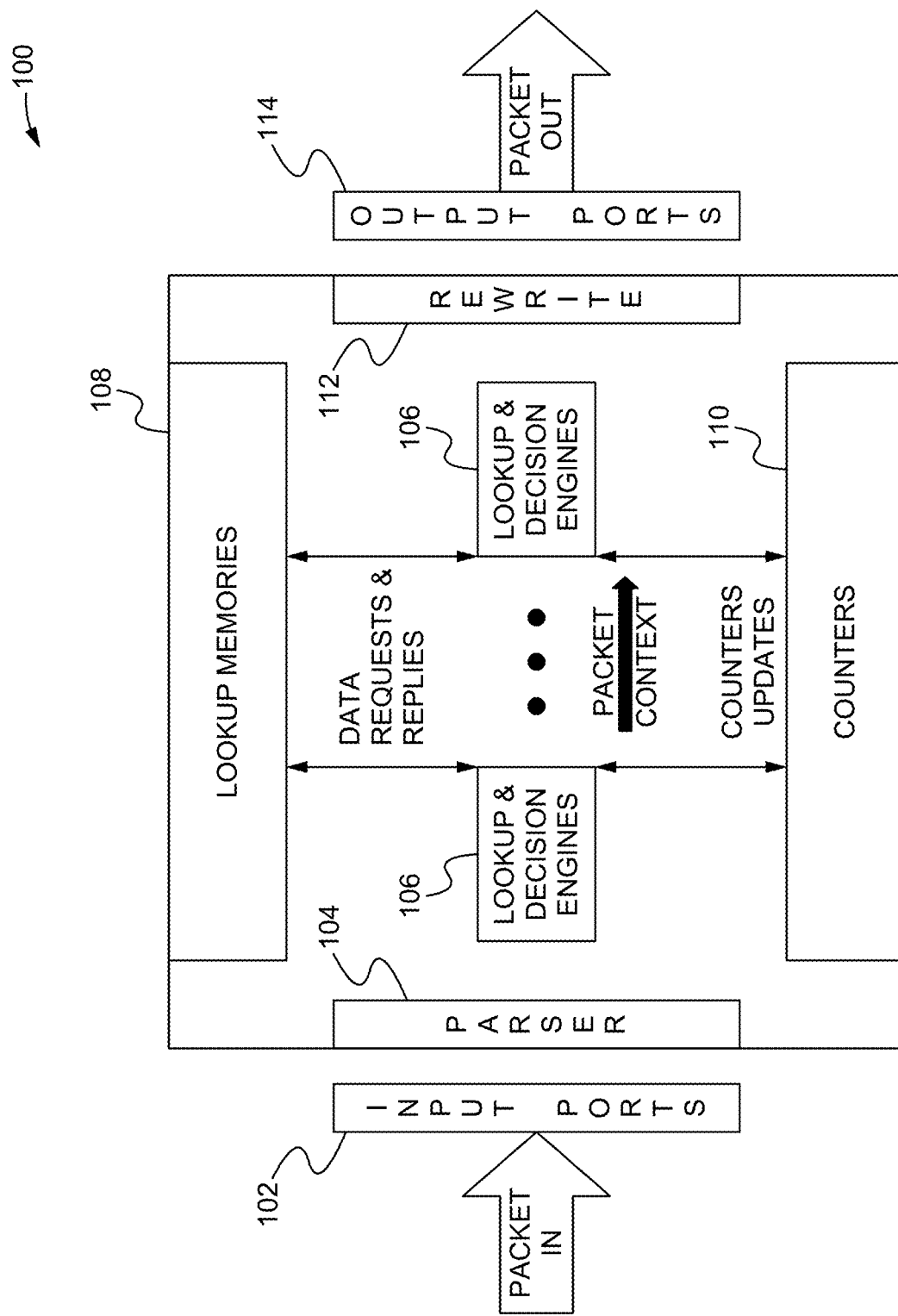
FIG. 1 illustrates a software defined network system according to some embodiments.

FIG. 1 illustrates a block diagram of a software-defined network (SDN) system 100 according to some embodiments. In some embodiments, the system 100 is able to comprise a single fully integrated switch microchip (e.g. a top of rack switch). Alternatively, the system 100 is able to comprise a plurality of communicatively coupled switch microchips that together and/or individually comprise the system 100. The system 100 (or each microchip within the system) comprises one or more input ports 102, a parser 104, a plurality of lookup and decision engines (LDEs) 106 (forming a pipeline and/or grid), lookup memories 108, counters 110, a rewrite block 112 and one or more output ports 114. The ports 102, 114 are for receiving and transmitting packets into and out of system 100. The parser 104 is a programmable packet header classifier that implements software defined protocol parsing. Specifically, instead of being hardcoded to specific protocols, the parser 104 is able to parse incoming headers based on a software defined parse tree. Thus, the parser is able to recognize and extract the necessary data from all desired headers. The lookup memories 108 are able to comprise direct access memory, hash memory, longest prefix match (LPM), ternary content-addressable memory (TCAM), static random access memory (SRAM) and or other types/allocations of memory used for operation of the system (e.g. as packet memory, buffer memory). In particular, the lookup memories 108 are able to comprise a pool of on-chip memories that are configured as a logical overlay providing software-defined variable scaling and width. As a result, the tables of the memory 108 are able to be logically independently set in hash, LPM, direct access or other operational modes and dynamically reformatted based on software needs.

Figure 13:
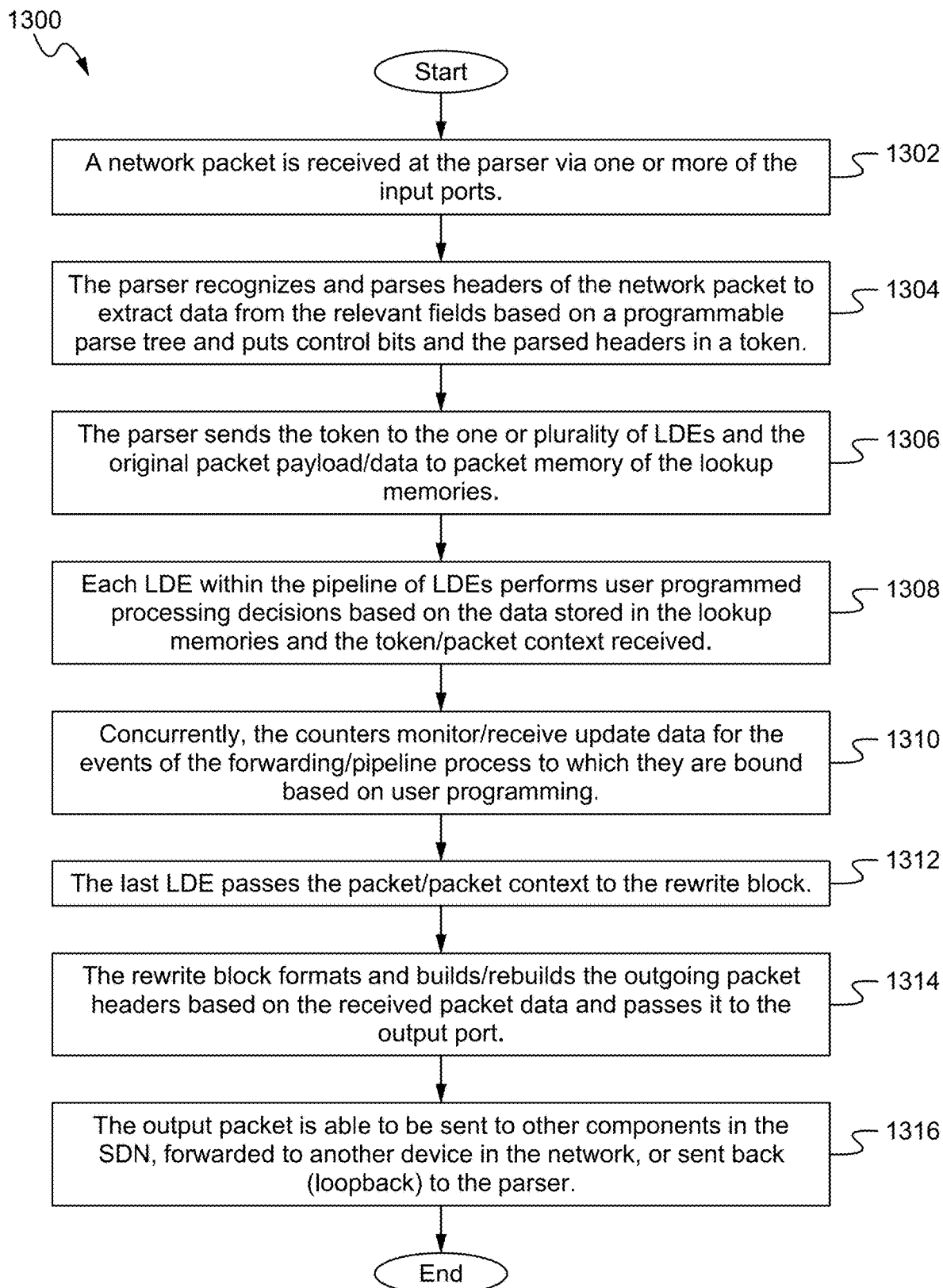
FIG. 13 illustrates a method of operating the SDN system according to some embodiments.

FIG. 13 illustrates a method of operating the SDN system according to some embodiments. As shown in FIG. 13, a network packet is received at the parser 104 via one or more if the input ports 102 at the step 1302. The parser 104 recognizes and parses headers of the network packet to extract data from the relevant fields based on a programmable parse tree and puts control bits and the parsed headers in a token at the step 1304. The parser 104 sends the token to the one or plurality of LDEs 106 and the original packet payload/data to packet memory of the lookup memories 108 at the step 1306. Each LDE 106 within the pipeline of LDEs performs user programmed processing decisions based on the data stored in the lookup memories 108 and the token/packet context received from the parser 104 (or the previous LDE 106) within the pipeline at the step 1308. At the same time, the counters 110 monitor/receive update data for the events of the forwarding/pipeline process to which they are bound based on user programming at the step 1310. Then at the end of the pipeline, the last LDE 106 passes the packet/packet context to the rewrite block 112 at the step 1312. The rewrite block 112 formats and builds/rebuilds the outgoing packet headers based on the received packet data and passes it to the output port where it is able to be output along with the corresponding packet data retrieved from the packet memory of the lookup memories 108 at the step 1314. In other words, the rewrite 112 is able to resolve the modifications required on the packet from the processing (for encapsulation and decapsulation) and thereby rebuilds and prepares the outgoing packets. As a result, the output packet is able to be sent to other components in the SDN system for further processing, or is forwarded to another device in the network, or can be sent back (loopback) to the parser to be able to do more lookups if desired at the step 1316.

Parser/Rewrite

The parser 104 is able to include one or more parser engines to identify contents of network packets and the rewriter 112 is able to include one or more rewrite engines to modify packets before they are transmitted out from the network switch. The parser engine(s) and the rewrite engine(s) are flexible and operate on a programmable basis. In particular, the parser 104 is able to decode packets and extract internal programmable layer information (as described in detail below), wherein the internal layer information is used by the system 100 to make forwarding decisions for that packet through the pipeline. Additionally as described below, the rewriter 112 performs transformations on this internal layer information in order to modify the packet as needed. As described above, the system 100 also includes a memory (e.g. lookup memories 108) to store data used by the system 100. For example, the memory is able to store a set of generic commands that are used to modify protocol headers. As another example, the memory is able to also store software-defined mappings of generic formats of protocols in the form of a parse map (or table), wherein each protocol header is represented according to one of the software-defined mappings that is specific to a corresponding protocol. As it will become evident, these mappings are able to be used to identify different variations of a protocol as well as on different protocols, including new protocols that were not previously known. In some embodiments, the parse map includes layer information of each protocol layer of each protocol layer combination that is programmed into the parse map (or table).

In Ethernet, packets include multiple protocol layers. Each protocol layer carries different information. Some examples of well known layers are Ethernet; PBB Ethernet;

ARP IPV4; IPV6; MPLS; FCOE; TCP; UDP; ICMP; IGMP; GRE; ICMPv6; VxLAN; TRILL and CNM. Theoretically, the protocol layers can occur in any order. However, only some well-known combinations of these layers occur. Some examples of valid combinations of these layers are Ethernet; Ethernet, ARP; Ethernet, CNM; Ethernet, FcoE; Ethernet, IPV4; Ethernet, IPV4, ICMP; and Ethernet, IPV4, IGMP.

In some embodiments, the network switch supports 17 protocols and eight protocol layers. There are therefore $8^{17}$ possible protocol layer combinations. A packet can include a three protocol layer combination such as Ethernet, IPv4 and ICMP. For another example, a packet can include a seven protocol layer combination such as, Ethernet, IPv4, UDP, VxLAN, Ethernet and ARP. Although there are $8^{17}$ possible protocol layer combinations, only some well-known combinations of these layers occur. In some embodiments, all known protocol layer combinations are uniquely identified and translated into a unique number called the packet identifier (PktID). A parse table stored in the memory of the network switch is able to be programmed to include layer information of each layer of each known protocol layer combination. In practice, this local parse table includes less than 256 protocol layer combinations. In some embodiments, this local table includes 212 known protocol layer combinations. The local table is able to be dynamically re-programmed to include more or less protocol layer combinations.

In some embodiments, the parser and/or rewriter described herein are able to be the same as the parser and/or rewriter described in U.S. patent application Ser. No. 14/309,603, entitled "Method of modifying packets to generate format for enabling programmable modifications and an apparatus thereof," and filed Jun. 19, 2014, which is hereby incorporated by reference. In some embodiments, the parser described herein are able to be the same as the parser described in U.S. patent application Ser. No. 14/675,667, entitled "A parser engine programming tool for programmable network devices," and filed Mar. 31, 2015, which is hereby incorporated by reference.

Parser

Figure 2:
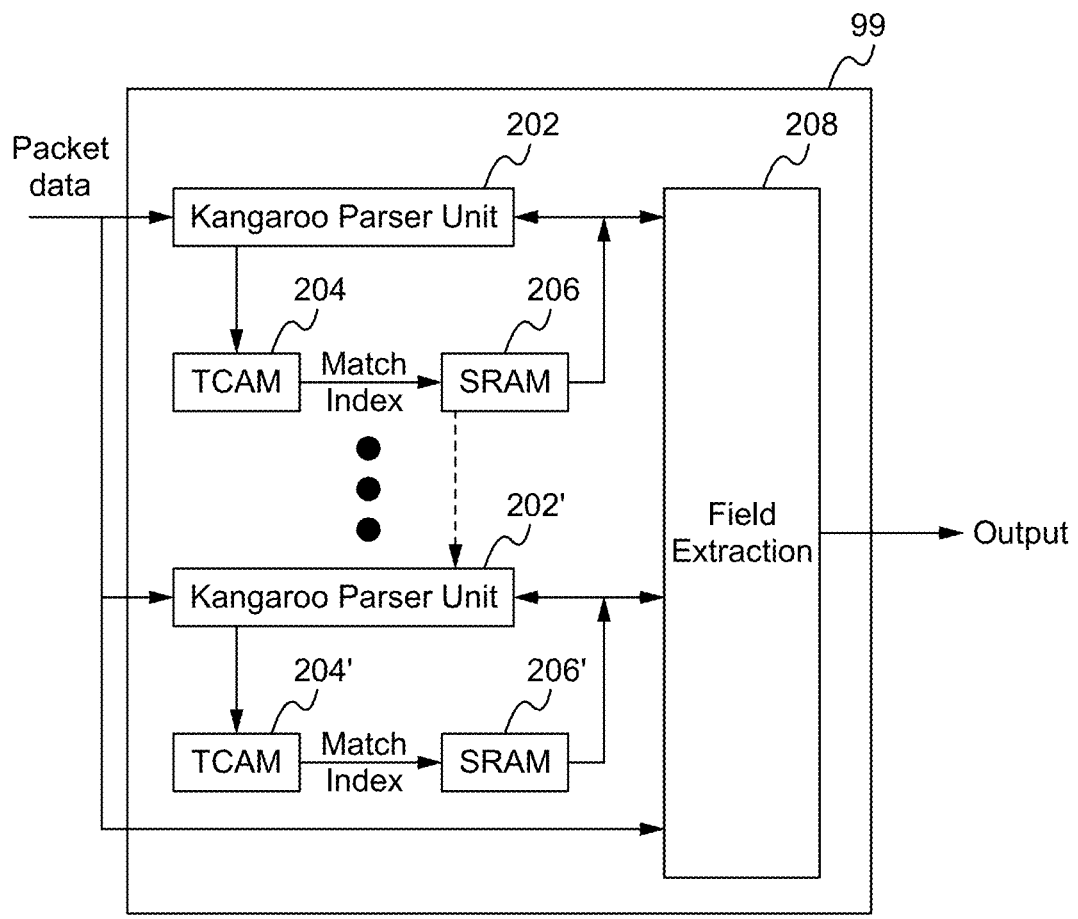
FIG. 2 illustrates a parser engine of the parser according to some embodiments.

FIG. 2 illustrates a parser engine 99 of the parser 104 according to some embodiments. As shown in FIG. 2, the parser engine 99 comprises one or more kangaroo parser units (KPUs) 202 coupled with a field extraction unit 208 and ternary content-addressable memory (TCAM) 204 paired with static random-access memory (SRAM) 206, wherein each SRAM 206 from one stage of the engine 99 is communicatively coupled with and thereby feeds a determined state/context (associated with a subject packet header) from that one stage to the KPU 202 of the next stage such that a parse tree/graph 300 (described below) is able to be followed when parsing a packet header. Alternatively, the TCAM 204 and/or SRAM 206 is able to be other types of memory as are known in the art. Additionally, although the TCAM 204, 204' and SRAM 206, 206' memory pairs are shown separate for each of the KPUs 202, 202', they are able to comprise a single TCAM memory and/or SRAM memory wherein each KPU 202, 202' is associated with a portion of the memory. In operation, the KPUs 202, 202' receive incoming packets 200 and parse the header data 202 of the packet 200 based on the parsing data stored in the TCAM 204 and SRAM 206. In particular, the header data 202 is able to be identified by the TCAM 204 and an index or other identifier of the TCAM 204 is able to be used to find the correct data within the SRAM 206 indicating what actions need to take place for the packet 200. Additionally, the data associated with the packet 200 within the SRAM 206 of any one of the KPU stages is able to include state/context information about the packet 200/header data 202 that is then sent to a KPU 202' of a subsequent stage to be included in the parsing tree/graph 300 thereby enabling the parse graph/tree to be transitioned or updated (e.g. to a next node within the graph/tree) based on the state/context data for the packet 200/header data 202 as described below. Based on the parsing of the header data 202, the field extraction unit 208 is able to extract the needed data from the packet 200 for output from the parser engine 99 such that the packet 200 is able to be properly processed.

In order for the parser engine 99 to be able to perform the above parsing functions, it is able to be programmed by a parse programming tool such that any type of header data (e.g. a header comprising one or more header layer types) within a range of possible header data specified is able to be properly parsed by the parser engine 99. As a result, the programming tool is configured to read the input configuration file and automatically (based on the data within the file) generate a set of values necessary to program the parser engine 99 to handle all of the possible header data represented by the configuration file.

Figure 3:
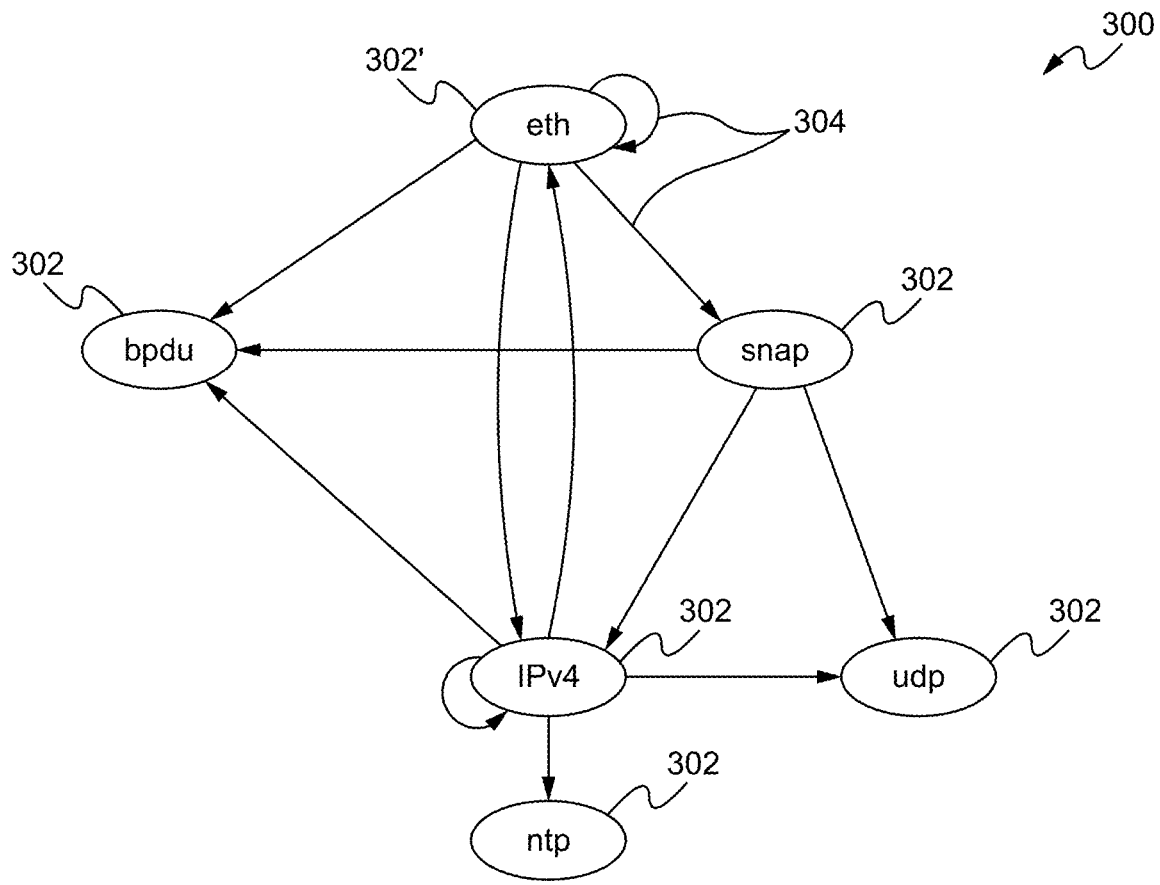
FIG. 3 illustrates an exemplary directly connected cyclical graph or parse tree according to some embodiments.

The configuration file indicates the range of possible header data that the parse engine 99 needs to be able to parse by describing a directly connected cyclical graph or parse tree of the possible header data. FIG. 3 illustrates an exemplary directly connected cyclical graph or parse tree 300 according to some embodiments. As shown in FIG. 3, the cyclical graph 300 comprises one or more nodes or leaves 302 that are each coupled together by unidirectional branches or edges 304. In particular, the cyclical graph or tree 300 is able to comprise a root node 302' as a starting point, a plurality of leaf nodes 302 and a plurality of transitions/branches 304 between the nodes 302. The nodes 302, 302' are able to each include a header type or layer name (e.g. eth, ipv4, arp, ptp), an advance or packet pointer offset value for the indicated header layer (not shown), a layer type identifier (not shown) and a state value within the layer (not shown). Although as shown in FIG. 3, the graph 300 comprises twelve branches 304 and six nodes 302, 302' having exemplary types coupled together according to an exemplary structure, more or less nodes 302, 302' of the same or different types coupled together by more or less branches 304 are contemplated. In some embodiments, the layer type corresponds to the seven layers of the open system interconnection (OSI) model. Alternatively, one or more of the layer types are able to deviate from the OSI model such that headers that would be in different layers according to OSI are given the same layer type value, or vice versa. Additionally, the nodes 302, 302' are able to comprise the header layer names of any connected nodes 302. The transitions/branches 304 are able to each include a match value (e.g. 8100) and a mask (e.g. ffff) associated with the transition between the two associated nodes 302. In that way, the match and mask values are able to represent that transition between the two nodes 302. As a result, the permutations of paths (between the nodes 302 via the branches 304) through the graph or tree 300 are each able to represent a set of header data 202 having the combination of packet headers represented by the nodes 302 within the path. These paths represent the range that need to be parsed by the KPUs 202 of the programmable parser engine 99.

In order to determine all the possible paths through the cyclical graph 300, the tool is able to walk the graph or tree 300 using a modified depth first search. In particular, starting from one of the nodes 302, the programming tool walks down one of the possible paths through the graph or tree 300

(as permitted by the directional connections) until the tool reaches a terminating node (e.g. a node with no outgoing branches 304) or the starting node (e.g. when a loop has been completed). Alternatively, in some embodiments even if the starting node is reached, the programming tool is able to continue until a terminating node is reached or the starting node is reached a second or more times. In any case, during the "walk," the tool is able to sequentially add the data associated with each node 302 and branch 304 traversed to a stack such that the stack includes a journal or list of the path taken. When the terminating node or starting node 302 is reached, the current stack is determined and saved as a complete path and the process is repeated to find a new complete path until all of the possible paths and their associated stacks have been determined. In this way, each of the combinations of headers that are able to form the header data 202 of a packet 200 are represented by one of the paths such that the programming tool provided the advantage of automatically identifying all of the possible header data 202 based on the input configuration file. In some embodiments, one or more of the header combinations or paths determined by the tool are able to be omitted. Alternatively, all of the headers possible within the graph or tree 300 are able to be included.

Finally, the parser programming tool is able to store the TCAM and SRAM values in the assigned TCAM 204 and SRAM 206 pairs of each of the KPUs 202 of the parser 104 such that the parser 104 is able to parse all of the possible headers 202 indicated within the graph or tree 300 of the input configuration file.

Figure 4:
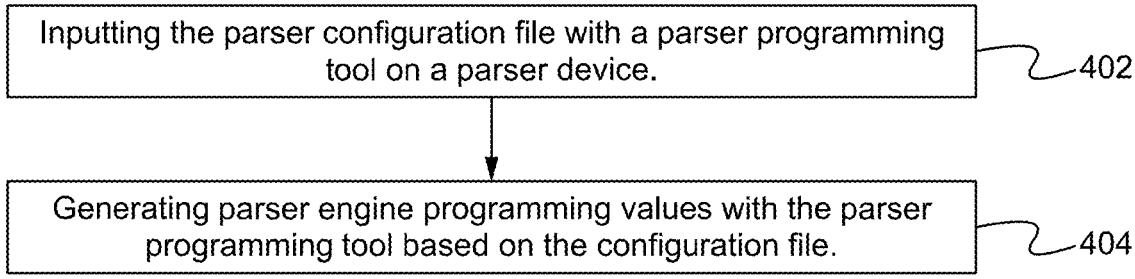
FIG. 4 illustrates a method of operating the parser programming tool according to some embodiments.

FIG. 4 illustrates a method of operating the parser programming tool according to some embodiments. As shown in FIG. 4, a parsing device storing the parser programming tool inputs the parser configuration file with the tool at the step 402. In some embodiments, the programming tool comprises a graphical user interface with an input features that enables the inputting of the parser configuration file. Alternatively, the programming tool is able to automatically search the parsing device for the configuration file. The parsing programming tool generates parser engine programming values based on the configuration file at the step 404. The values, when programmed into a memory (e.g. TCAM 204, SRAM 206) associated with each of a plurality of parsing engines (e.g. KPUs 202), are able to enable the parsing engines to identify each of a set of different combinations of packet headers (e.g. header data 202) represented by the configuration file. In some embodiments, the generating of the values is based on one or more of the possible paths with a graph 300 of the parser configuration file, wherein each of the paths corresponds to a separate combination of packet headers 202 (e.g. stack or flattened stack). In some embodiments, generating the values includes the parser programming tool automatically calculating all of the paths of the directly connected cyclical graph 300. For example, the tool is able to determine each of the paths either end and start at the same node 302 within the graph or end at a terminating node 302 within the graph 300 that has no outgoing branches 304. In some embodiments, the method further comprises the tool storing a first portion of the values within entries of the TCAM 204 such that the data associated with header types having different layer types do not occupy the TCAM entry. In some embodiments, the method further comprises the tool automatically removing duplicate entries of the entries of the TCAM 204. As a result, the method provides the advantage of automatically programming one or more parsing engines such that they are able to parse any combination of header types forming the header data 202 of a packet 200 as represented by a configuration file.

Rewrite

FIG. 5 illustrates an exemplary structure of the local parse table 500 in accordance with some embodiments. The parse map 500 is able to be defined by software in order to customize the parsing/rewriting for known and unknown incoming packet headers. In other words, the packet generalization scheme allows software to define a small set of generic commands, which is purely based on a given protocol layer and is independent of the layers preceding or following this protocol layer. This has the added benefit of providing hardware flexibility to future-proof itself against protocol changes and additions. Each protocol layer combination in the parse table 500, which is indexed using PktID, includes information for each protocol layer of that protocol layer combination, which is shown as Layer0 Information, Layer1 Information and LayerN Information. By indexing the PktID, information for all N layers of a packet can be accessed or retrieved.

The information for each protocol layer is able to comprise the following: Layer Type, Layer Data Offset and Miscellaneous Information. However, more information can be stored in the local table 500. Briefly, the Layer Type refers to an associated protocol (e.g., IP/TCP/UDP/Ethernet) of the protocol layer, Layer Data Offset provides a start location of layer data in the protocol layer, and the Miscellaneous Information includes data such as checksum and length data. Upon parsing an incoming packet, the parser engine is able to identify the PktID of the incoming packet based on the parse table. Specifically, each combination of layer types that make up a packet header has a unique PkID. The rewrite engine uses the PktID as key to the parse table, which gives the rewrite engine all the information needed to generalize each protocol layer of the packet for modification. In other words, the rewrite engine uses the PktID to access or retrieve information for each of the protocol layers in the packet from the parse table, instead of receiving parsed results from the parser engine.

Layer Type. The unique combination of the Layer Type and a hash on one or more fields of the packet provides the rewrite engine a "generic format" for each protocol layer. In some embodiments, this unique combination specifies one of software-defined mappings of generic formats of protocols that are stored in the memory. The generic format is used by the rewrite engine to expand the protocol layers and to modify the protocol layers using software commands. This information also tells the rewrite engine where each protocol layer starts within the packet.

Layer Data Offset. The rewrite engine uses data to modify an incoming header layer. This data can be spread anywhere in the packet. Since layer sizes can vary, so can the offsets to the data that the rewrite engine needs to use during modifications, which limits hardware flexibility on what data the rewrite engine can pick up and from where.

Extracted data from incoming packet headers are arranged in a layered manner. The extracted data structure is arranged such that starting offsets of layer-data-structure is unique per PktID. The Layer Data Offset of each layer is used to identify the location of the extracted data for modifications. Since the structure of the layers within a packet and locations of the extracted data from the layers are identified through the PktID of the packet, software and hardware uses the same unique identifier to manage the extracted data, which simplifies the commands in the rewrite engine. Miscellaneous information. Information, such as checksum and length data, tells the rewrite engine about special handing requirements, such as checksum re-calculation and header length update, for the associated protocol layer.

Figure 6:
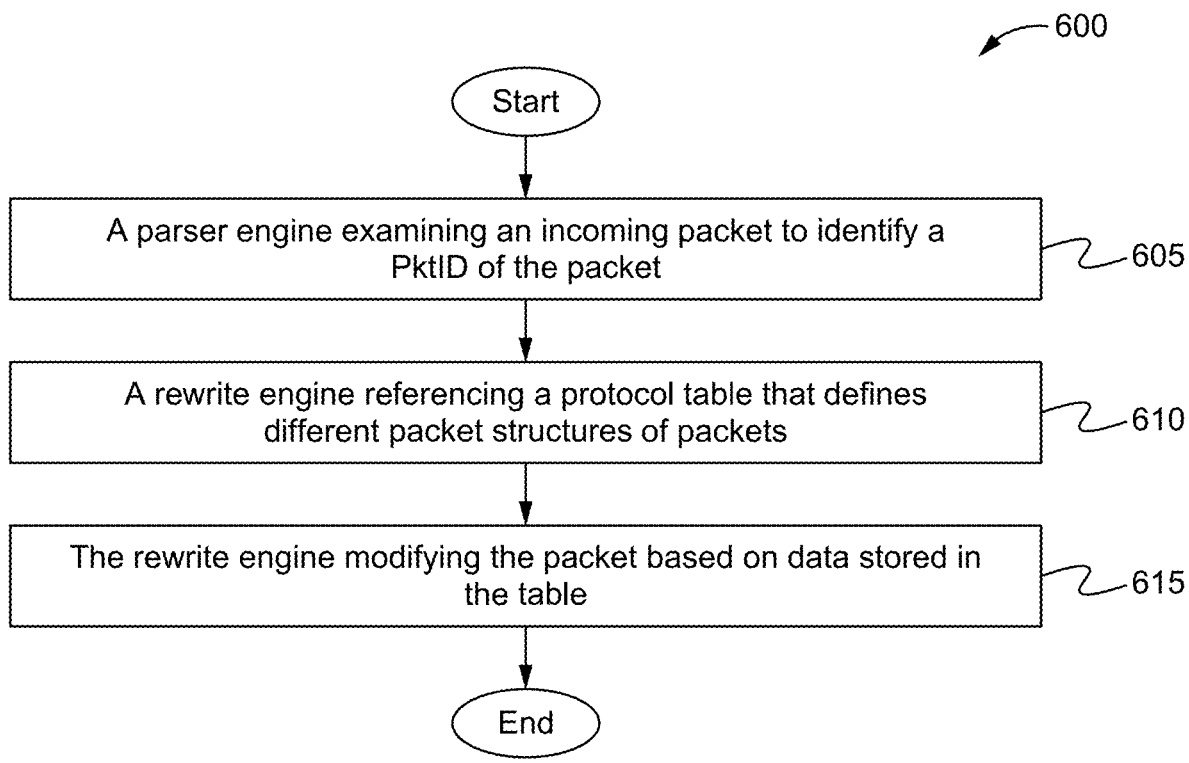
FIG. 6 illustrates an exemplary method of a network switch in accordance with some embodiments.

FIG. 6 illustrates an exemplary method 600 of the network switch in accordance with some embodiments. At a step 605, the parser engine examines an incoming packet to identify a PktID of the packet. In some embodiments, the parser engine passes the PktID to the rewrite engine rather than passing parsed data of the packet to the rewrite engine. At a step 610, the rewrite engine references a parse table that defines different packet structures of packets received by the network switch. The rewrite engine uses the PktID as a key to the parse table to extract information for each protocol layer of the packet necessary for modification. At a step 615, the rewrite engine modifies the packet based on data stored in the parse table. Typically, the rewrite engine expands each protocol layer of the packet prior to modifying the packet. Protocol layer expansion and modification are discussed elsewhere.

Figure 7:
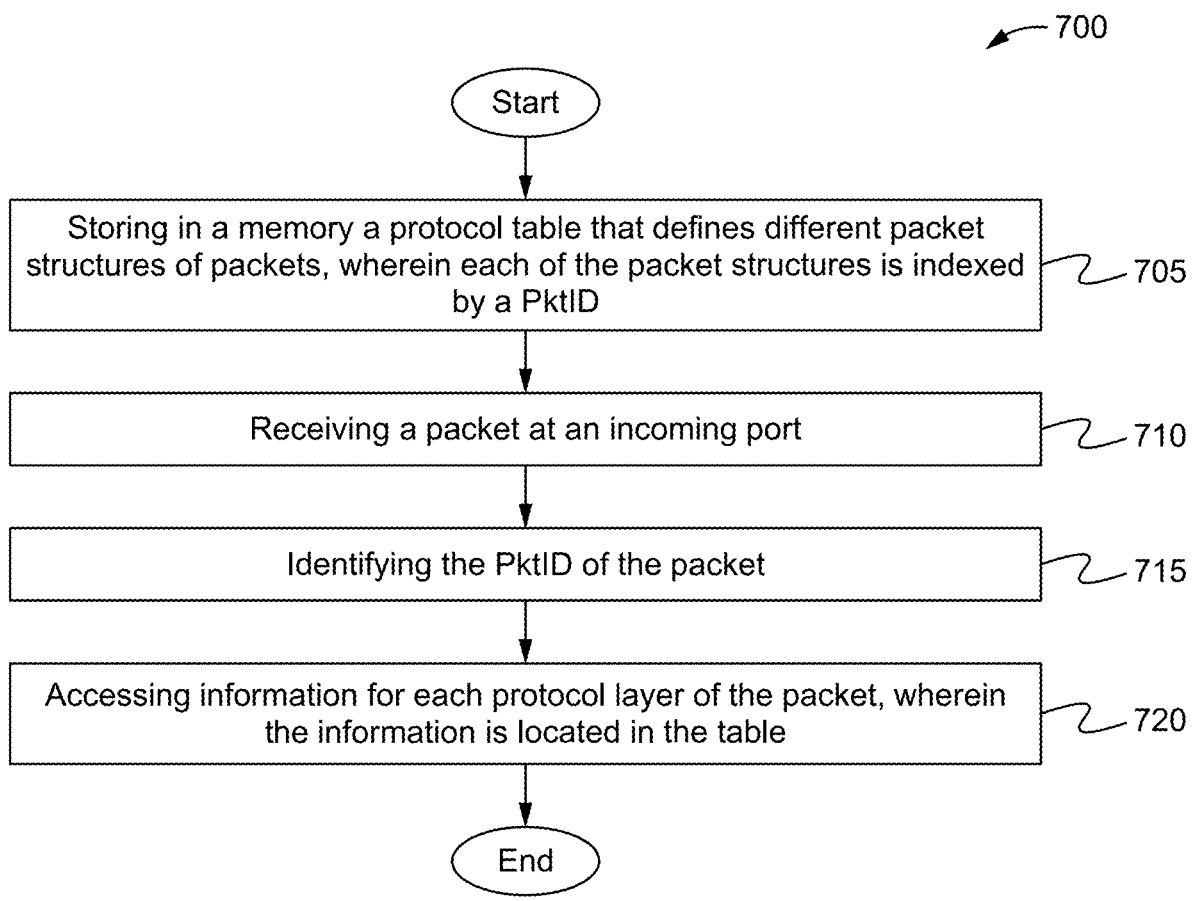
FIG. 7 illustrates another exemplary method of the network switch in accordance with some embodiments.

FIG. 7 illustrates another exemplary method 700 of the network switch in accordance with some embodiments. At a step 705, a parse table is stored and/or programmed into the memory (e.g. lookup memories 108). The parse table defines different packet structures of packets. Each of the packet structures is indexed by a PktID. Each of the packet structures represents a protocol layer combination and includes layer information of each protocol layer of the protocol layer combination. The parse table can be updated to add a new packet structure representative of a new protocol. The parse table can also be updated to modify a packet structure in response to a change in a protocol. Thus, the parse map is able to be changed dynamically via software. At a step 710, a packet is received at the incoming port. At a step 715, the PktID of the packet is identified. In some embodiments, a parser identifies the PktID of the packet. At a step 720, information (e.g. generalization information) for each protocol layer of the packet is accessed. The information is located in the parse table. The information is then able to be used to generalize each layer of the protocol header of the packet according to a generic format for a corresponding protocol. The generic format is software-defined in the memory (e.g. is able to be adjusted as desired by the user via programming/re-programming) In other words, each protocol layer of a header is able to be expanded such that any missing optional or other fields from layer of the header are able to be added back into the layer as zeros. Thus, once expanded each layer of the header will include values for all possible fields even if they were missing from the layer of the header as received. A bit vector is then able to be stored that indicates which of the fields are valid data and which of the fields were added for the purpose of the generalization.

The generalized protocol header can be modified by applying at least one command to the generalized protocol header. In some embodiments, the generalized protocol header is modified by creating a bit vector using the information to determine a location of data that is used to modify the generalized protocol header. In particular, each bit of the bit vector represents if a byte of the header is valid or was added (during the expansion/generalization) in order to fill in for a missing field (e.g. an optional field of the header protocol that was not used). The rewrite engine generalizes the protocol header and modifies the generalized protocol header. Each protocol layer has a respective protocol. More or less protocol layers are possible as indicated above. The rewrite engine is able to detect missing fields from any of the protocol headers and to expand each protocol header to its generic format. A generalized/canonical layer refers to a protocol layer that has been expanded to its generic format.

Briefly, each canonical layer includes a bit vector with bits marked as 0 for invalid fields and bits marked as 1 for valid fields.

The rewrite engine not only uses the bit vector for each protocol header to allow expansion of the protocol header based a generic format for modification, the rewrite engine also uses the bit vector to allow collapse of the protocol header from the generic format to a "regular" header. Typically, each bit in the bit vector represents a byte of the generalized protocol header. A bit marked as 0 in the bit vector corresponds to an invalid byte, while a bit marked as 1 in the bit vector corresponds to a valid byte. The rewrite engine uses the bit vector to remove all the invalid bytes after all commands have been operated on the generalized protocol header to thereby form a new protocol header. The rewrite engine therefore uses bit vectors to allow expansion and collapse of protocol headers of packets, thereby enabling flexible modification of the packets by using a set of generic commands. Thus, the rewrite provides the benefit of being programmable such that a user is able to assemble a modification of the packet that suits their needs (e.g. expansion, collapse or other software defined packet modification by the rewrite).

Lookup and Decision Engines

Lookup and Decision Engines 106 are able to generate lookup keys for input tokens and to modify the input tokens based on lookup results such that the corresponding network packets can be correctly processed and forwarded by other components in the system 100. The conditions and rules for generating keys and modifying tokens are fully programmable by software and are based on network features and protocols configured for the LDE 106. The LDE 106 includes two main blocks: a Key Generator and an Output Generator. As named, the Key Generator generates a set of lookup keys for each input token, and the Output Generator generates an output token, which is a modified version of the input token based on the lookup results. The Key Generator and the Output Generator have a similar design architecture, which includes a Control Path and a Data Path. The Control Path examines whether specific fields and bits in its input satisfy conditions of the configured protocols. Based on the examination outcomes, it generates instructions accordingly. The Data Path executes all instructions produced by the Control Path for generating the set of lookup keys in the Key Generator or for generating the output token in the Output Generator. The conditions and rules for key and output generations are fully programmable in the Control Paths of the Key Generator and the Output Generator. In other words, LDE 106 is able to enable programmable formation of an Input Key to be used for matching the lookup memory and a programmable formation of the Output Key for results returning from the lookup memory, along with the merging of the Input token with the lookup table result to form the Output token that is passed to the next addressable LDE.

The LDE 106 also includes an Input FIFO for temporarily storing the input tokens, a Lookup Result Collector/Merger for collecting the lookup results for the lookup keys, a Loopback Check for sending an output token back to the LDE 106 in the case where multiple serial lookups is required for that token at the same LDE 106, and a Loopback FIFO for storing loopback tokens. The loopback path has higher priority than an input path to guarantee deadlock freedom.

In some embodiments, the LDEs described herein are able to be the same as the LDEs described in U.S. patent application Ser. No. 14/144,270, entitled "Apparatus and Method of Generating Lookups and Making Decisions for Packet Modifying and Forwarding in a Software-Defined Network Engine," and filed Dec. 30, 2013, which is hereby incorporated by reference. Additionally, the Key Generator and the Output Generator are similarly configured as an SDN processing engine discussed in U.S. patent application Ser. No. 14/144,260, entitled "Method and Apparatus for Parallel and Conditional Data Manipulation in a Software-Defined Network Processing Engine," and filed Dec. 30, 2013, which is hereby incorporated by reference.

Figure 8:
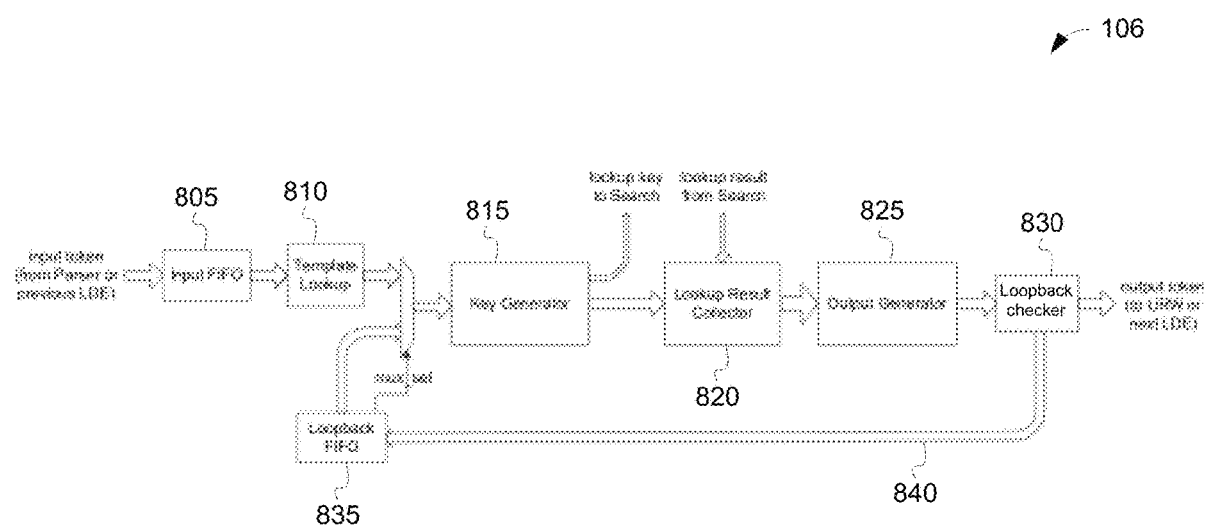
FIG. 8 illustrates a block diagram of an LDE for generating lookup keys and modifying tokens according to an embodiment.

FIG. 8 illustrates a block diagram of an LDE 106 for generating lookup keys and modifying tokens according to an embodiment. As described above, the SDN engine 106 is called a Lookup and Decision Engine. The LDE 106 generates lookup keys and modifies input tokens based on lookup results and content of the input tokens. Conditions and rules for generating lookup keys and modifying the input tokens are programmable by users.

The LDE 106 can receive the input tokens from a Parser. The Parser parses headers of each network packet and outputs an input token for each network packet. An input token has a predefined format such that the LDE 106 will be able to process the input token. The LDE 106 can also receive the input tokens from a previous LDE if multiple LDEs are coupled in a chain for performing, in serial, multiple lookup and token modification steps.

The input tokens received at the LDE 106 from an upstream Parser or an upstream LDE are first buffered inside an Input FIFO 805. The input tokens wait inside the Input FIFO 805 until the LDE is ready to process them. If the Input FIFO 805 is full, the LDE 106 notifies the source of the input tokens (i.e., an upstream Parser or an upstream LDE) to stop sending new tokens.

Positions of fields in each input token are identified by looking up from a table, namely Template Lookup block 810. The input tokens are next sent to a Key Generator 815. The Key Generator 815 is configured to pick up specific data in the input tokens for building the lookup keys. Configuration of the Key Generator 815 is user-defined and depends on network features and protocols users want the LDE 106 to perform.

A lookup key (or set of lookup keys) per each input token is output from the Key Generator 815 and is sent to a remote Search Engine (not illustrated). The remote Search Engine can perform multiple configurable lookup operations such as TCAM, direct-access, hash-based and longest prefix matching lookup. For each lookup key sent to the remote Search Engine, a lookup result is returned to the LDE 106 at a Lookup Result Collector/Merger 820.

While generating a lookup key (or set of lookup keys) for each input token, the Key Generator 815 also passes the input token to the Lookup Result Collector/Merger 820. The input token is buffered inside the Lookup Result Collector/Merger 820. The input token waits inside the Lookup Result Collector/Merger 820 until the lookup result is returned by the remote Search Engine. Once the lookup result is available, the input token along with the lookup result are sent to an Output Generator 825.

Based on the lookup result and content of the input token, the Output Generator 825 modifies one or several fields of the input token before sending the modified token to output. Similar to the Key Generator 815, configuration of the Output Generator 825 regarding, for example, conditions and rules for token modification, is user-defined and depends on network features and protocols users want the LDE 106 to perform.

After the token is modified, the modified token is sent to a Loopback Checker 830. The Loopback Checker 830 determines whether the modified token should be either sent back to the current LDE for doing another lookup or sent to another engine in the associated SDN system. This loopback check is a design option that advantageously allows a single LDE to perform multiple lookups in serial for the same token rather than using multiple engines to do the same. This design option is useful in a system with a limited number of LDEs due to limitations, such as chip area budget. Tokens sent back to the current LDE are buffered inside a Loopback FIFO 835 via a loopback path 840. The loopback path 840 always has higher priority than the input path (e.g., from the Input FIFO 805) to avoid deadlock. Although FIG. 8 has been described as using FIFO buffers, other buffer types are possible.

Lookup Memories

When data requests/lookups are made to the lookup memories 108 by the LDEs 106 or other components of the system 100, the system 100 supports multiple parallel lookups that share a pool of the lookup memories 108. The number of memories 108 reserved for each lookup is programmable/reconfigurable based on the memory capacity needed by that lookup. In other words, the lookup memories 108 are able to be dynamically reconfigured for capacity and logical functionality. In addition, each lookup can be configured to perform as a hash-based lookup or direct-access lookup. The shared memories are grouped into homogeneous tiles. Each lookup is allocated a set of tiles. The tiles in the set are not shared with other sets such that all lookups are able to be performed in parallel without collision. The system 100 also includes reconfigurable connection networks which are programed based on how the tiles are allocated for each lookup.

Figure 9:
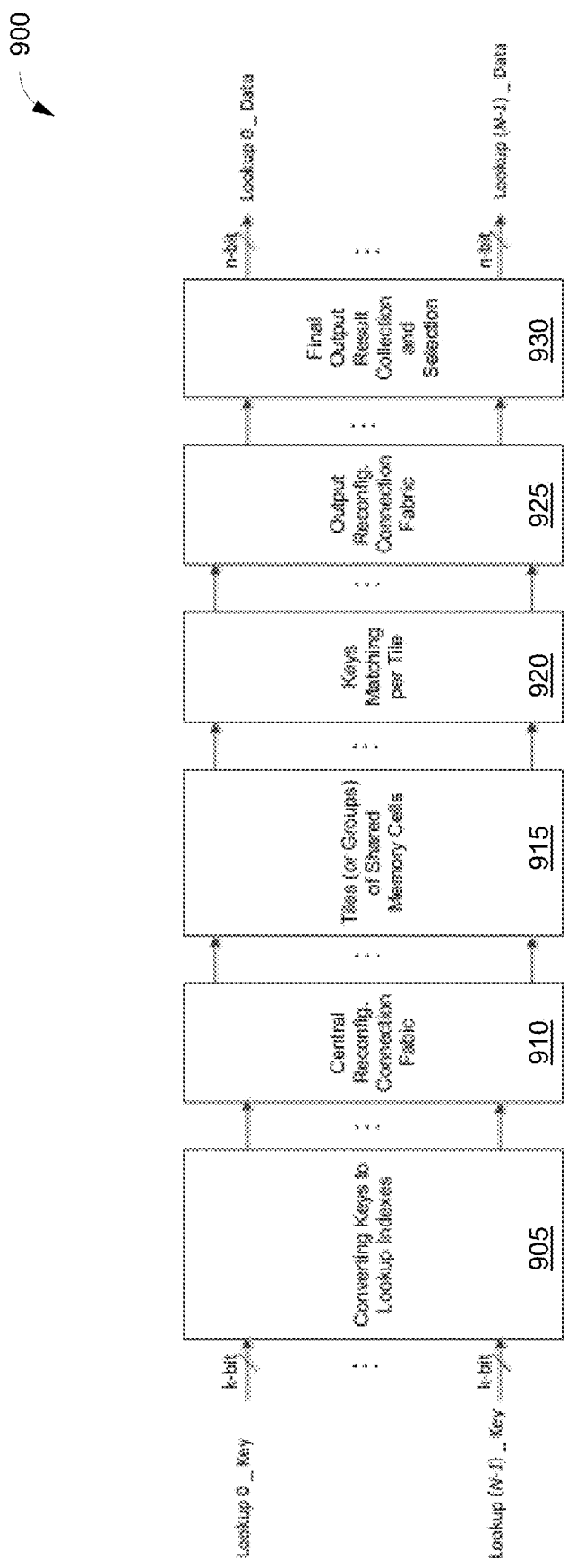
FIG. 9 illustrates a lookup memory system according to an embodiment.

FIG. 9 illustrates a lookup memory system 900 according to an embodiment. The system 900 is configured for N simultaneous or parallel lookup paths, without collision, using a plurality of shared memories. The system 900 returns n-bit data for each k-bit input key per lookup path. The system 900 includes blocks 905-930. The pool of shared lookup memories 108 at the block 915 are grouped into T shared homogeneous tiles. Each tile contains M memories. Each lookup path is allocated a number of tiles from these T tiles. The tile allocation for each lookup path is reconfigurable by software such that, for example, the scaling and width is able to be adjusted.

At the block 905, an input key of each lookup path is converted to a plurality of lookup indexes. Information for reading lookup data, such as Tile IDs of respective tiles that the lookup path will access and addresses of memories in those tiles from which data will be read, become part of the lookup indexes. The Tile IDs and the memory addresses of each input key are sent to their corresponding tiles though the block 910, which is a central reconfiguration interconnection fabric. The central reconfiguration interconnection fabric 910 includes a plurality of configurable central networks. These central networks are configured based on locations of the tiles that are reserved for the respective lookup path.

In each tile, at the block 920, pre-programmed keys and data are read from the memories at the addresses that had been previously converted from the corresponding input key (e.g., conversion at the block 910). These pre-programmed keys located in the memories are compared to the input key for the respective lookup path. If there is any match among these pre-programmed keys with the input key, then the tile returns a hit data and a hit address. The hit information of each tile is collected by the respective lookup path which owns that tile through the block 925, which is an output reconfigurable interconnection network. Each lookup path performs another round of selection among the hit information of all tiles it owns at the block 930 before a final lookup result is returned for that lookup path.

Figure 10:
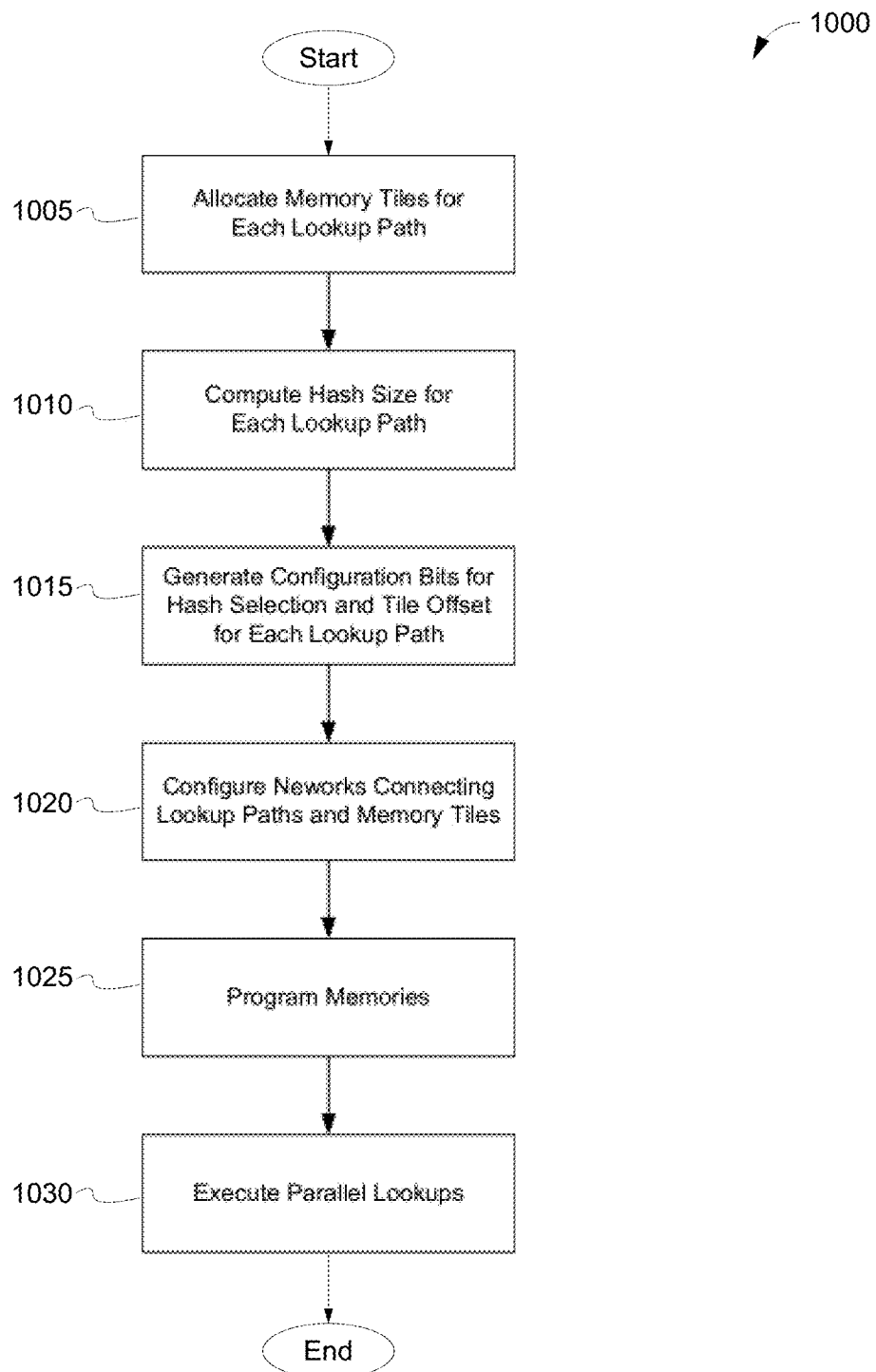
FIG. 10 illustrates a method of configuring and programming a parallel lookup memory system according to an embodiment.

FIG. 10 illustrates a method of configuring and programming a parallel lookup memory system 1000 according to an embodiment. The parallel lookup memory system 900 has N parallel lookup paths with T shared tiles. Each tile has M memories. Each memory has a memory address m-bit wide. Each memory entry contains P pairs of {key, data} which are programmable by software. Each lookup in the system 900 is a D-LEFT lookup with M ways and P buckets per way. The method 1000 begins at a step 1005, where a user allocates tiles for each lookup path. The number of tiles allocated to each lookup path must be a power of 2. The tile partition also must guarantee that there is no tile overlap among lookup paths. At a step 1010, hash size of each lookup path is computed. The hash size for each lookup path is based on the number of tiles allocated for that lookup path. If a lookup path is allocated q tiles, then its hash size is equal to $\log_2(q)+m$.

After the hash size of each lookup is known, at a step 1015, registers cfg_hash_sel and cfg_tile_offset in the index converters are configured accordingly. The cfg_hash_sel register selects a function for the lookup path. The cfg_tile_offset register adjusts the Tile ID of a lookup index for the lookup path. Meanwhile, at a step 1020, central and output interconnect networks are configured to connect the lookup paths with their reserved tiles. All configuration bits for index converters and networks can be automatically generated by a script according to the principles described herein. At a step 1025, the memories allocated for each lookup path are programmed. Programming technique is based on a D-LEFT lookup technique with M ways per lookup and P buckets per way. After all allocated memories are programmed, at a step 1030, the parallel lookup system 100 is ready to receive input keys and execute N lookups in parallel.

Embodiments relate to multiple parallel lookups using a pool of shared lookup memories 108 by proper configuration of interconnection networks. The number of shared memories 108 reserved for each lookup is reconfigurable based on the memory capacity needed by that lookup. The shared memories 108 are grouped into homogeneous tiles. Each lookup is allocated a set of tiles based on the memory capacity needed by that lookup. The tiles allocated for each lookup do not overlap with other lookups such that all lookups can be performed in parallel without collision. Each lookup is reconfigurable to be either hash-based or direct-access. The interconnection networks are programed based on how the tiles are allocated for each lookup. In some embodiments, the lookup memories and/or lookup memory system described herein are able to be the same as the lookup memories and/or lookup memory system described in U.S. patent application Ser. No. 14/142,511, entitled "Method and system for reconfigurable parallel lookups using multiple shared memories," and filed Dec. 27, 2013, which is hereby incorporated by reference.

Counters

The counter block 110 is able to comprise a plurality of counters that are able to be programmed such that they are each bound to one or more events within the packet processing within the system 100 in order to track data about those selected events. Indeed, the counter block 110 is able to be configured to count, police and/or sample simultaneously on a packet. In other words, each counter (or counter block 110 sub-unit) is able to be configured to count, sample and/or police. For example, an LDE 106 is able to request concurrent activity be monitored by the counter block 110 such that a packet may be sampled, policed and counted concurrently or simultaneously by the block 110. Additionally, each counter is able to be provisioned for an average case and to handle overflow via an overflow FIFO and an interrupt to a process monitoring the counters. This counter block architecture addresses a general optimization problem, which can be stated as, given N counters, for a certain CPU read interval T, of how to minimize the number of storage bits needed to store and operate these N counters. Equivalently, this general optimization problem can also be stated as, given N counters and a certain amount of storage bits, of how to optimize and increase CPU read interval T. This counter block architecture extends the counter CPU read interval linearly with depth of the overflow FIFO.

Figure 11:
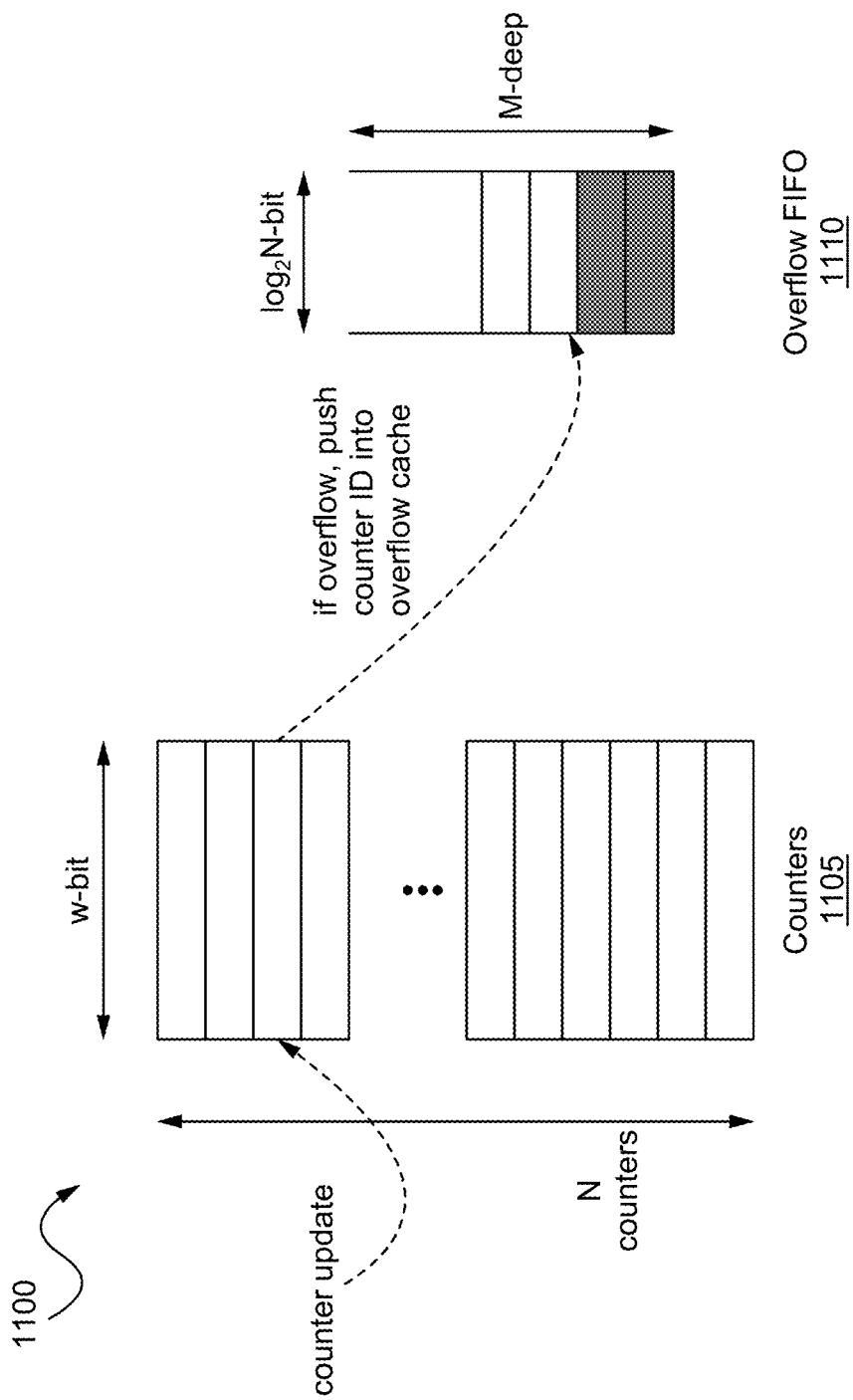
FIG. 11 illustrates a block diagram of a counter block according to an embodiment.

FIG. 11 illustrates a block diagram of a counter block according to an embodiment. The counter block 1100 is implemented in a high speed network device, such as a network switch. The architecture 1100 includes N wrap-around counters 1105 and an overflow FIFO 1110. Each of the N counters is w-bits wide and is associated with a counter identification. Typically, the counter identification is an unique identification of that counter. In some embodiments, the counters are stored in an on-chip SRAM memory, using two banks of memory. Exemplary counters and memory banks are discussed in U.S. patent application Ser. No. 14/289,533, entitled "Method and Apparatus for Flexible and Efficient Analytics in a Network Switch," filed May 28, 2014, which is hereby incorporated by reference in its entirety. The overflow FIFO can be stored in SRAM. Alternatively, the overflow FIFO is fixed function hardware. The overflow FIFO is typically shared and used by all N counters.

The overflow FIFO stores the associated counter identifications of all counters that are overflowing. Typically, as soon as any of the N counters 1105 starts overflowing, the associated counter identification of the overflowed counter is stored in the overflow FIFO 1110. An interrupt is sent to a CPU to read the overflow FIFO 1110 and the overflowed counter. After the overflowed counter is read, the overflowed counter is cleared or reset.

In a timing interval T, the number of counter overflow is M=ceiling(PPS*T/$2^w$), wherein PPS is packets per second, and w is the bit width of each counter. The total count of packets during interval T is PPS*T. Assume PPS is up to 654.8 MPPS, T=1, w=17 and N=16 k. Based on these assumptions, there are up to 4,995 overflow events per second.

The overflow FIFO is typically M-deep and $\log_2 N$-bits wide to capture all counter overflows. As such, the counter block 1100 requires w*N+M*$\log_2 N$ total storage bits, where M=ceiling(PPS*T/$2^w$).

Figure 12:
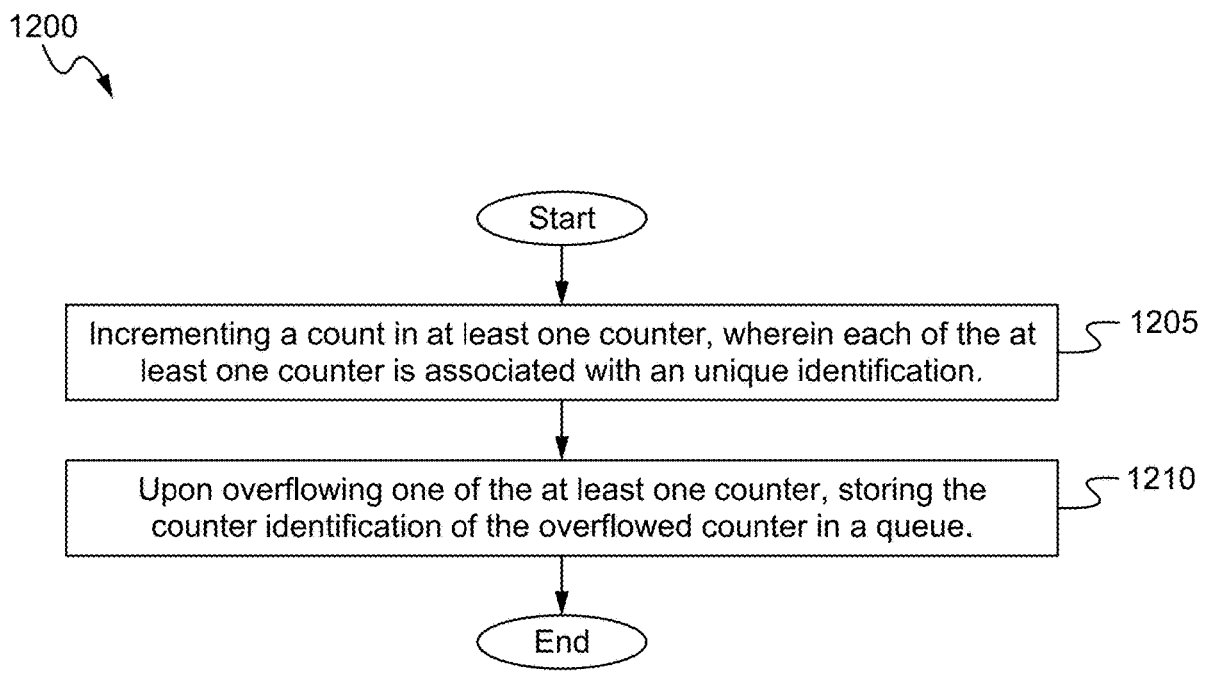
FIG. 12 illustrates a method of a counter block, such as the counter block of FIG. 11, according to an embodiment.

FIG. 12 illustrates a method 1200 of a counter block, such as the counter block 100 of FIG. 11, according to an embodiment. At a step 1205, a count in at least one counter is incremented. As discussed above, each counter is associated with an unique identification. Typically, all counters are wrap-around counters and have the same width. For example, if w=17, then the largest value that each counter represents is 131,071. For another example, if w=18, then the largest value that each counter represents is 262,143. For yet another example, if w=19, then the largest value that each counter represents is 524,287. An overflow occurs when an arithmetic operation attempts to create a numeric value that is too large to be represented within an available counter.

At a step 1210, upon overflowing one of the at least one counter, the counter identification of the overflowed counter is stored in a queue. In some embodiments, the queue is a FIFO buffer. The queue is typically shared and used by all counters in the counter block 1100. In some embodiments, storing the counter identification in the queue sends an interrupt to the CPU to read values from the queue and the overflowed counter. It is possible to then calculate the actual value of the overflowed counter from the read values. After the overflowed counter is read by the CPU, the overflowed counter is typically cleared or reset.

For example, a counter with 5 as its counter identification is the first counter to overflow during arithmetic operations. The counter identification (i.e., 5) is then stored in the queue, presumably at the head of the queue since counter #5 is the first counter to overflow. In the meantime, the count in counter #5 can still be incremented. In the meantime, other counters can also overflow, with the counter identifications of those counters being stored in the queue.

An interrupt is sent to the CPU to read the value at the head of the queue (i.e., 5). The CPU reads the current value stored in the counter associated with the counter identification (i.e., counter #5). Since the counter width is known, the actual value of the counter can be calculated. Specifically, the actual value of the counter is $2^w$ plus the current value stored in the counter. Continuing with the example, assume the current value of counter #5 is 2 and w=17. The actual value of counter #5 is 131,074 ($=2^{17}+2$). As long as the queue is not empty, the CPU continuously reads and clears the values from the queue and the counters.

The final total count of a particular counter is: the number of times the counter identification appears in the queue*$2^w$ plus counter remainder value.

Although the counters have been described as for counting packets, it should be noted that the counters can be used for counting anything, such as bytes. Generally, an expected total count during T is calculated as EPS*T, where EPS is events per second. An upper bound of this maximum total count during time interval T can be established or calculated since the network switch is typically designed with a certain bandwidth from which the event rate can be calculated. In some embodiments, the counters described herein are able to be the same as the counters described in U.S. patent application Ser. No. 14/302,343, entitled "Counter with overflow FIFO and a method thereof," and filed Jun. 11, 2014, which is hereby incorporated by reference.

The SDN system, device and method described herein has numerous advantages. Specifically, as described above, it provides the advantage of utilizing a generic packet forwarding pipeline that is fully programmable such that the forwarding intelligence of various network protocol packets is imparted onto the LDEs through software. Additionally, the system provides the advantage of enabling complete software defined control over the resource management for forwarding tables within the system enabling the system to be configured to match the scaling profiles as required by various places within the network. Further, the system provides the ability to programmatically customize the performance of the system creating unified hardware and software that can be used in various deployments. Further, it allows optimization tailed deployment to application specific needs. In other words, the system software-defined flexibility provides the ability to customize the same switch microchip such that it provides the same high bandwidth and high port density despite being positioned in multiple different places within a network. Thus, the information processing system, device and method has many advantages.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of operating a switch microchip for a software-defined network, the method comprising:
   parsing packet context data from headers of a plurality of incoming packets with a programmable parser based on a software-defined parse graph of the parser including a plurality of paths; and
   transmitting one or more data lookup requests to and receiving processing data based on the requests from dynamically reconfigurable lookup memories with the lookup and decision engines, wherein the lookup memories are configured as a logical overlay such that the scaling and width of a portion of the lookup memories allocated to each of the paths is software-defined by the user.

2. The method of claim 1, wherein starting from the same initial node of the parse graph, each path through the parse graph represents a combination of layer types of one of the headers that is able to be recognized by the parser.

3. The method of claim 2, wherein portions of the paths overlap.

4. The method of claim 1, further comprising expanding each layer of each of the headers parsed by the parser with a rewrite block to form a expanded layer type of a generic size based on a protocol associated with the layer.

5. The method of claim 4, wherein the rewrite block generates a bit vector that indicates which portions of the expanded layer type contain valid data and which portions of the expanded layer type contain data added during the expanding by the rewrite block.

6. The method of claim 1, wherein the tables of the lookup memories are each able to be independently set in hash, direct access or longest prefix match operational modes.

7. The method of claim 6, wherein the tables of the lookup memories are able to be dynamically reformatted and reconfigured by the user such that a number of tiles of the lookup memories partitioned and allocated for lookup paths coupled to the lookup memories is based on memory capacity needed by each of the lookup paths.

8. The method of claim 1, wherein the transmitting is by at least one lookup and decision engine including:
   a Key Generator configured to generate a set of lookup keys for each input token; and
   an Output Generator configured to generate an output token by modifying the input token based on content of lookup results associated with the set of lookup keys.

9. The method of claim 1, further comprising performing counting operations with a counter block that comprises:
   N wrap-around counters, wherein each of the N wrap-around counters is associated with a counter identification; and
   an overflow FIFO used and shared by the N wrap-around counters, wherein the overflow FIFO stores the associated counter identifications of all counters that are overflowing.

10. A method of operating a switch microchip for a software-defined network, the method comprising:

parsing packet context data from headers of a plurality of incoming packets with a programmable parser based on a software-defined parse graph of the parser including a plurality of paths; and transmitting one or more data lookup requests to and receiving processing data based on the requests from dynamically reconfigurable lookup memories with the lookup and decision engines, wherein the lookup memories are configured as a logical overlay such that the scaling and width of a portion of the lookup memories allocated to each of the paths is software-defined by the user, wherein each of the lookup and decision engines comprise:

an Input Buffer for temporarily storing input tokens before input tokens are processed by the lookup and decision engine;

a Profile Table for identifying positions of fields in each of the input tokens;

a Lookup Result Merger for joining the input token with the lookup result and for sending the joined input token with the lookup result to the Output Generator;

a Loopback Checker for determining whether the output token should be sent back to the current lookup and decision engine or to another lookup and decision engine; and a Loopback Buffer for storing loopback tokens.

11. The method of claim 10, wherein Control Paths of both the Key Generator and the Output Generator are programmable such that users are able to configure the lookup and decision engine to support different network features and protocols.

* * * * *